US012114146B2

(12) United States Patent
Laitinen et al.

(10) Patent No.: US 12,114,146 B2
(45) **Date of Patent: *Oct. 8, 2024**

(54) DETERMINATION OF TARGETED SPATIAL AUDIO PARAMETERS AND ASSOCIATED SPATIAL AUDIO PLAYBACK

(71) Applicant: Nokia Technologies Oy, Espoo (FI)

(72) Inventors: Mikko-Ville Laitinen, Espoo (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,618

(22) Filed: Aug. 24, 2023

(65) Prior Publication Data

US 2024/0007814 A1 Jan. 4, 2024

Related U.S. Application Data

(63) Continuation of application No. 16/761,399, filed as application No. PCT/FI2018/050788 on Oct. 30, 2018, now Pat. No. 11,785,408.

(30) Foreign Application Priority Data

Nov. 6, 2017 (GB) ..................................... 1718341

(51) Int. Cl.
*H04S 3/02* (2006.01)
*G10L 19/008* (2013.01)

(52) U.S. Cl.
CPC ............. *H04S 3/02* (2013.01); *G10L 19/008* (2013.01); *H04S 2400/15* (2013.01); *H04S 2420/03* (2013.01); *H04S 2420/11* (2013.01)

(58) Field of Classification Search
CPC .... H04S 3/02; H04S 2400/15; H04S 2420/03; H04S 2420/11; G10L 19/008
(Continued)

(56) References Cited

U.S. PATENT DOCUMENTS 9,369,164 B2 6/2016 Kim
9,747,905 B2 8/2017 Pang
(Continued)

FOREIGN PATENT DOCUMENTS

CN 1957640 A 5/2007
CN 101860784 A 10/2010
(Continued)

OTHER PUBLICATIONS

Politis, Archontis, et al., "Enhancement of Ambisonic Binaural Reproduction Using Directional Audio Coding with Optimal Adaptive Mixing", 2017 IEEE Workshop on Applications of Signal Processing to Audio and Acoustics, Oct. 15-18, 2017, 2 pgs.
(Continued)

*Primary Examiner* — Xu Mei
(74) *Attorney, Agent, or Firm* — Harrington & Smith

(57) ABSTRACT

An apparatus configured to: determine at least one spatial audio parameter for providing spatial audio reproduction; determine at least one transport signal; determine at least one coherence parameter for at least two frequency bands, wherein a sound scene is configured to be reproduced based, at least partially, on the at least one transport signal, the at least one spatial audio parameter, and the at least one coherence parameter; and provide the at least one transport signal, the at least one spatial audio parameter, and the at least one coherence parameter for encoding.

20 Claims, 14 Drawing Sheets

(58) Field of Classification Search
USPC .......................................................... 381/22, 23
See application file for complete search history.

(56) References Cited

U.S. PATENT DOCUMENTS

| | | | |
|---|---|---|---|
| 9,820,073 B1 | 11/2017 | Foti | |
| 11,412,336 B2 * | 8/2022 | Laitinen | G10L 19/008 |
| 11,457,310 B2 * | 9/2022 | Laitinen | H04R 3/005 |
| 11,470,436 B2 * | 10/2022 | Laitinen | G10L 25/21 |
| 11,785,408 B2 * | 10/2023 | Laitinen | G10L 19/008 381/23 |
| 11,832,078 B2 * | 11/2023 | Laitinen | G10L 19/008 |
| 11,832,080 B2 * | 11/2023 | Laitinen | H04R 5/027 |
| 2005/0157883 A1 | 7/2005 | Herre | 381/17 |
| 2007/0002971 A1 | 1/2007 | Purnhagen | 375/316 |
| 2007/0233293 A1 | 10/2007 | Villemoes et al. | 700/94 |
| 2007/0258607 A1 | 11/2007 | Purnhagen | 381/307 |
| 2009/0110203 A1 | 4/2009 | Taleb | 381/17 W |
| 2010/0169102 A1 | 7/2010 | Samsudin et al. | |
| 2012/0082319 A1 | 4/2012 | Jot | 381/63 |
| 2012/0163606 A1 | 6/2012 | Bronen | |
| 2013/0216047 A1 | 8/2013 | Kuech et al. | 381/26 |
| 2013/0236021 A1 | 9/2013 | Purnhagen et al. | 381/20 |
| 2013/0262130 A1 | 10/2013 | Ragot | 704/500 |
| 2014/0233762 A1 | 8/2014 | Vilkamo et al. | 381/119 |
| 2015/0170657 A1 | 6/2015 | Thompson et al. | |
| 2019/0066701 A1 | 2/2019 | Fatus | |
| 2019/0156841 A1 | 5/2019 | Fatus | |
| 2019/0394606 A1 | 12/2019 | Tammi | |
| 2020/0045494 A1 | 2/2020 | Liu | |
| 2021/0219084 A1 | 7/2021 | Laitinen | |

FOREIGN PATENT DOCUMENTS

| | | | |
|---|---|---|---|
| CN | 102273233 | A | 12/2011 |
| CN | 103765507 | A | 4/2014 |
| CN | 105230044 | A | 1/2016 |
| CN | 105981411 | A | 9/2016 |
| CN | 106415716 | A | 2/2017 |
| EP | 2560161 | A1 | 2/2013 |
| GB | 2554446 | A | 4/2018 |
| JP | 2007531915 | A | 11/2007 |
| WO | WO 2005/101370 | A1 | 10/2005 |
| WO | WO 2005/101905 | A1 | 10/2005 |
| WO | WO 2008/032255 | A2 | 3/2008 |
| WO | WO 2008/046531 | A1 | 4/2008 |
| WO | WO 2008/100098 | A1 | 8/2008 |
| WO | WO 2010/080451 | A1 | 7/2010 |
| WO | WO-2013/024085 | A1 | 2/2013 |
| WO | WO-2015/081293 | A1 | 6/2015 |
| WO | WO-2017/153697 | A1 | 9/2017 |
| WO | WO-2019/086757 | A1 | 5/2019 |

OTHER PUBLICATIONS

Politis, Archontis, et al., "Sector-Based Parametric Sound Field Reproduction in the Spherical Harmonic Domain", IEEE Journal of Selected Topics in Signal Processing, Jul. 14, 2015, 2 pgs.

Pulkki, Ville, "Virtual Sound Source Positioning Using Vector Base Amplitude Panning", © Audio Engineering Society, Inc. 1997, 11 pgs.

3GPP TSG-SA#1 102 Meeting, Jan. 28-Feb. 1, 2019, Bruges, Belgium, TDoc S4(19)0121, "Proposal for MASA Format" Nokia Corporation, 10 pgs.

3GPP TSG-SA4#98 Meeting, Apr. 9-13, 2018, Kista, Sweden, TDoc S4(18)0462, "On Spatial Metadata for IVAS Spatial Audio Input Format" Nokia Corporation, 7 pgs.

Ahrens, Jens et al. "Two Physical Models for Spatially Extended Virtual Sound Sources" AES Convention 131, Oct. 2011, AES, New York, USAQ, Oct. 19, 2011.

Lebart, K., et al., "A New Method Based on Spectral Subtraction for Speech Dereverberation", Acustica vol. 87, pp. 359-366, Apr. 2001.

Vilkamo, Juha, et al., "Optimized Covariance Domain Framework for Time-Frequency Processing of Spatial Audio", J. Audio Eng. Soc., vol. 61, No. 6, pp. 403-411, Jun. 2013.

Laitinen, Mikko-Ville, et al., « Utilizing Instantaneous Direct-to-Reverberant Ratio in Parametric Spatial Audio Coding, Audio Engineering Society Convention Paper 8804, 10 pages, Oct. 2012.

* cited by examiner

DETERMINATION OF TARGETED SPATIAL AUDIO PARAMETERS AND ASSOCIATED SPATIAL AUDIO PLAYBACK

RELATED APPLICATION

This application is a continuation of U.S. patent application Ser. No. 16/761,399, filed May 4, 2020, which is a National Stage Entry of International Application No. PCT/FI2018/050788, filed Oct. 30, 2018. Both applications are hereby incorporated by reference in their entirety, and claim priority to GB 1718341.9 filed Nov. 6, 2017.

FIELD

The present application relates to apparatus and methods for sound-field related parameter estimation in frequency bands, but not exclusively for time-frequency domain sound-field related parameter estimation for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata for an audio codec. For example, these parameters can be estimated from microphone-array captured audio signals, and for example a stereo signal can be generated from the microphone array signals to be conveyed with the spatial metadata. The stereo signal could be encoded, for example, with an EVS or AAC encoder. A decoder can decode the audio signals into PCM signals, and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

However it can be easily demonstrated that the metadata representations as described above cannot convey all relevant aspects of a multi-channel input such as the 5.1 or 7.1 mix conventionally used in many systems. Such aspects relate to the methods the studio engineers use to generate the artistic surround loudspeaker mixes. Specifically, the studio engineers may use coherent reproduction of the sound at two or more directions, which is a scenario that is not well accounted for by the sound-field related parameterization utilizing the direction and ratio metadata in frequency bands.

Hence there is a need to more effective metadata parameters to more accurately convey the relevant aspects of a multi-channel input.

SUMMARY

There is provided according to a first aspect a method for spatial audio signal processing, comprising: determining, for two or more playback audio signals, at least one spatial audio parameter for providing spatial audio reproduction; determining between the two or more playback audio signals at least one audio signal relationship parameter, the at least one audio signal relationship parameter being associated with a determination of inter-channel signal relationship information between the two or more playback audio signals and for at least two frequency bands, such that the two or more playback audio signals are configured to be reproduced based on the at least one spatial audio parameter and the at least one audio signal relationship parameter.

Determining between the two or more playback audio signals at least one audio signal relationship parameter may comprise determining at least one coherence parameter, the at least one coherence parameter being associated with a determination of inter-channel coherence information between the two or more playback audio signals and for the at least two frequency bands.

Determining, for two or more playback audio signals, at least one spatial audio parameter for providing spatial audio reproduction may comprise determining, for the two or more playback audio signals, at least one direction parameter and at least one energy ratio.

The method may further comprise determining a downmix signal from the two or more playback audio signals, wherein the two or more playback audio signals may be reproduced based on the at least one spatial audio parameter, the at least one coherence parameter and/or the downmix signal.

Determining between the two or more playback audio signals at least one coherence parameter may comprise determining a spread coherence parameter, wherein the spread coherence parameter may be determined based on an inter-channel coherence information between two or more playback audio signals spatially adjacent to an identified playback audio signal, the identified playback audio signal being identified based on the at least one spatial audio parameter.

Determining a spread coherence parameter may comprise: determining a stereoness parameter associated with indicating that the two or more playback audio signals are reproduced coherently using two playback audio signals spatially adjacent to the identified playback audio signal, the identified playback audio signal being the playback audio signal spatially closest to the at least one direction parameter; determining a coherent panning parameter associated with indicating that the two or more playback audio signals are reproduced coherently using at least two or more playback audio signals spatially adjacent to the identified playback audio signal; and generating the spread coherence parameter based on the stereoness parameter and the coherent panning parameter.

Generating the spread coherence parameter based on the stereoness parameter and the coherent panning parameter may comprise setting the spread coherence parameter to: a maximum of 0.5 or 0.5 added to the difference of the stereoness parameter and coherent panning parameter when either the stereoness parameter and coherent panning parameter are greater than 0.5 and the coherent panning parameter is greater than the stereoness parameter; or a maximum of the stereoness parameter and coherent panning parameter otherwise.

Determining the stereoness parameter may comprise: computing a covariance matrix associated with the two or more playback audio signals; determining a playback audio signal spatially closest to the at least one direction parameter and a pair of spatially adjacent playback audio signals associated with the playback audio signal closest to the at least one direction parameter; determining an energy of the channel closest to the at least one direction parameter and the pair of adjacent playback audio signals based on the covariance matrix; determining a ratio between the energy of the pair of adjacent playback audio signals and a combination of the playback audio signal spatially closest to the at least one direction and the pair of playback audio signals; normalising the covariance matrix; and generating the stereoness parameter based on a normalised coherence between the pair of playback audio signals multiplied by the ratio between the energy of the pair of playback audio signals and a combination of the playback audio signal spatially closest to the at least one direction and the pair of playback audio signals.

Determining the coherent panning parameter may comprise: determining normalized coherence values between the playback audio signal spatially closest to the at least one direction and each of the pair of playback audio signals; selecting the minimum value of the normalized coherence values, the minimum value depicting a coherence among the playback audio signals; determining an energy distribution parameter to depict how evenly the energy is distributed; generating the coherent panning parameter based on the product of the minimum value of the normalized coherence values and the energy distribution parameter.

Determining at least one coherence parameter may comprise determining a surrounding coherence parameter, wherein the surrounding coherence parameter is determined based on an inter-channel coherence between two or more playback audio signals.

Determining the surrounding coherence parameter may comprise: computing a covariance matrix associated with the two or more playback audio signals; monitoring a playback audio signal with the largest energy determined based on the covariance matrix and a sub-set of other playback audio signals, wherein the sub-set is a determined number between 1 and one less than a total number of playback audio signals with the next largest energies; generating the surrounding parameter based on selecting the minimum of normalized coherences determined between the playback audio signal with the largest energy and each of the next largest energy playback audio signals.

The method may further comprise modifying the at least one energy ratio based on the at least one coherence parameter.

Modifying the at least one energy ratio based on the at least one coherence parameter may comprise: determining a first alternative energy ratio based on an inter-channel coherence information between two or more playback audio signals spatially adjacent to an identified playback audio signal, the identified playback audio signal being identified based on the at least one spatial audio parameter; determining a second alternative energy ratio based on an inter-channel coherence information between the identified playback audio signal and the two or more playback audio signals spatially adjacent to the identified playback audio signal; and selecting as a modified energy ratio one of the at least one energy ratio, the first alternative energy ratio, and the second alternative energy ratio based on a maximum value of the at least one energy ratio, the first alternative energy ratio and the second alternative energy ratio.

The method may further comprise encoding the downmix signal, the at least one direction parameter, the at least one energy ratio and the at least one coherence parameter.

According to a second aspect there is provided a method for synthesising a spatial audio comprising: receiving at least one audio signal, the at least one audio signal based on two or more playback audio signals; receiving at least one audio signal relationship parameter, the at least one audio signal relationship parameter based on a determination of inter-channel signal relationship information between the two or more playback audio signals and for at least two frequency bands; receiving at least one spatial audio parameter for providing spatial audio reproduction; reproducing the two or more playback audio signals based on the at least one audio signal, the at least one spatial audio parameter and the at least one audio signal relationship parameter.

Receiving at least one audio signal relationship parameter, the at least one audio signal relationship parameter based on a determination of inter-channel signal relationship information between the two or more playback audio signals and for at least two frequency bands may comprise receiving at least one coherence parameter, the at least one coherence parameter based on a determination of inter-channel coherence information between the two or more playback audio signals and for the at least two frequency bands.

The at least one spatial audio parameter may comprise at least one direction parameter and at least one energy ratio, wherein reproducing the two or more playback audio signals based on the at least one audio signal, the at least one spatial audio parameter and the at least one audio signal relationship parameter may further comprise: determining a target covariance matrix from the at least one spatial audio parameter, the at least one coherence parameter and an estimated covariance matrix based on the at least one audio signal; generating a mixing matrix based on the target covariance matrix and estimated covariance matrix based on the at least one audio signal; and applying the mixing matrix to the at least one audio signal to generate at least two output spatial audio signals for reproducing the two or more playback audio signals.

Determining a target covariance matrix from the at least one spatial audio parameter, the at least one audio signal relationship parameter and the estimated covariance matrix comprises: determining a total energy parameter based on the estimated covariance matrix; determining a direct energy and an ambience energy based on the total energy parameter and the at least one energy ratio; estimating an ambience covariance matrix based on the determined ambience energy and one of the at least one coherence parameters; estimating at least one of: a vector of amplitude panning gains; an Ambisonic panning vector or at least one head related transfer function, based on an output channel configuration and/or the at least one direction parameter; estimating a direct covariance matrix based on: the vector of amplitude panning gains, Ambisonic panning vector or the at least one head related transfer function; a determined direct part energy; and a further one of the at least one coherence parameters; and generating the target covariance matrix by combining the ambience covariance matrix and direct covariance matrix.

According to a third aspect there is provided an apparatus for spatial audio signal processing, the apparatus comprising at least one processor and at least one memory including a computer program code, the at least one memory and the computer program code configured to, with the at least one processor, cause the apparatus at least to: determine, for two or more playback audio signals, at least one spatial audio parameter for providing spatial audio reproduction; determine between the two or more playback audio signals at least one audio signal relationship parameter, the at least one audio signal relationship parameter being associated with a determination of inter-channel signal relationship information between the two or more playback audio signals and for at least two frequency bands, such that the two or more playback audio signals are configured to be reproduced based on the at least one spatial audio parameter and the at least one audio signal relationship parameter.

The apparatus caused to determine between the two or more playback audio signals at least one audio signal relationship parameter may be caused to further determine at least one coherence parameter, the at least one coherence parameter being associated with a determination of inter-channel coherence information between the two or more playback audio signals and for the at least two frequency bands.

The apparatus caused to determine, for two or more playback audio signals, at least one spatial audio parameter for providing spatial audio reproduction may be further caused to further determine, for the two or more playback audio signals, at least one direction parameter and at least one energy ratio.

The apparatus may be further caused to determine a downmix signal from the two or more playback audio signals, wherein the two or more playback audio signals may be reproduced based on the at least one spatial audio parameter, the at least one coherence parameter and/or the downmix signal.

The apparatus may be further caused to determine between the two or more playback audio signals at least one coherence parameter may be further configured to determine a spread coherence parameter, wherein the spread coherence parameter may be determined based on an inter-channel coherence information between two or more playback audio signals spatially adjacent to an identified playback audio signal, the identified playback audio signal being identified based on the at least one spatial audio parameter.

The apparatus caused to determine a spread coherence parameter may be further caused to: determine a stereoness parameter associated with indicating that the two or more playback audio signals are reproduced coherently using two playback audio signals spatially adjacent to the identified playback audio signal, the identified playback audio signal being the playback audio signal spatially closest to the at least one direction parameter; determine a coherent panning parameter associated with indicating that the two or more playback audio signals are reproduced coherently using at least two or more playback audio signals spatially adjacent to the identified playback audio signal; and generate the spread coherence parameter based on the stereoness parameter and the coherent panning parameter.

The apparatus caused to generate the spread coherence parameter based on the stereoness parameter and the coherent panning parameter may be further caused to set the spread coherence parameter to: a maximum of 0.5 or 0.5 added to the difference of the stereoness parameter and coherent panning parameter when either the stereoness parameter and coherent panning parameter are greater than 0.5 and the coherent panning parameter is greater than the stereoness parameter; or a maximum of the stereoness parameter and coherent panning parameter otherwise.

The apparatus caused to determine the stereoness parameter may be further caused to: compute a covariance matrix associated with the two or more playback audio signals; determine a playback audio signal spatially closest to the at least one direction parameter and a pair of spatially adjacent playback audio signals associated with the playback audio signal closest to the at least one direction parameter; determine an energy of the channel closest to the at least one direction parameter and the pair of adjacent playback audio signals based on the covariance matrix; determine a ratio between the energy of the pair of adjacent playback audio signals and a combination of the playback audio signal spatially closest to the at least one direction and the pair of playback audio signals; normalising the covariance matrix; and generate the stereoness parameter based on a normalised coherence between the pair of playback audio signals multiplied by the ratio between the energy of the pair of playback audio signals and a combination of the playback audio signal spatially closest to the at least one direction and the pair of playback audio signals.

The apparatus caused to determine the coherent panning parameter may be further caused to: determine normalized coherence values between the playback audio signal spatially closest to the at least one direction and each of the pair of playback audio signals; select the minimum value of the normalized coherence values, the minimum value depicting a coherence among the playback audio signals; determining an energy distribution parameter to depict how evenly the energy is distributed; and generate the coherent panning parameter based on the product of the minimum value of the normalized coherence values and the energy distribution parameter.

The apparatus caused to determine at least one coherence parameter may be further caused to determine a surrounding coherence parameter, wherein the surrounding coherence parameter is determined based on an inter-channel coherence between two or more playback audio signals.

The apparatus caused to determine the surrounding coherence parameter may be further caused to: compute a covariance matrix associated with the two or more playback audio signals; monitor a playback audio signal with the largest energy determined based on the covariance matrix and a sub-set of other playback audio signals, wherein the sub-set is a determined number between 1 and one less than a total number of playback audio signals with the next largest energies; generate the surrounding parameter based on selecting the minimum of normalized coherences determined between the playback audio signal with the largest energy and each of the next largest energy playback audio signals.

The apparatus may be further caused to modify the at least one energy ratio based on the at least one coherence parameter.

The apparatus caused to modify the at least one energy ratio based on the at least one coherence parameter may be further caused to: determine a first alternative energy ratio based on an inter-channel coherence information between two or more playback audio signals spatially adjacent to an identified playback audio signal, the identified playback audio signal being identified based on the at least one spatial audio parameter; determine a second alternative energy ratio based on an inter-channel coherence information between the identified playback audio signal and the two or more playback audio signals spatially adjacent to the identified playback audio signal; and select as a modified energy ratio one of the at least one energy ratio, the first alternative energy ratio, and the second alternative energy ratio based on a maximum value of the at least one energy ratio, the first alternative energy ratio and the second alternative energy ratio.

The apparatus may be further caused to encode the downmix signal, the at least one direction parameter, the at least one energy ratio and the at least one coherence parameter.

According to a fourth aspect there is provided an apparatus for spatial audio signal processing, the apparatus comprising at least one processor and at least one memory including a computer program code, the at least one memory and the computer program code configured to, with the at least one processor, cause the apparatus at least to: receive at least one audio signal, the at least one audio signal based on two or more playback audio signals; receive at least one audio signal relationship parameter, the at least one audio signal relationship parameter based on a determination of inter-channel signal relationship information between the two or more playback audio signals and for at least two frequency bands; receive at least one spatial audio parameter for providing spatial audio reproduction; reproduce the two or more playback audio signals based on the at least one audio signal, the at least one spatial audio parameter and the at least one audio signal relationship parameter.

The at least one audio signal relationship parameter, the at least one audio signal relationship parameter based on a determination of inter-channel signal relationship information between the two or more playback audio signals and for at least two frequency bands may comprise at least one coherence parameter, the at least one coherence parameter based on a determination of inter-channel coherence information between the two or more playback audio signals and for the at least two frequency bands.

The at least one spatial audio parameter may comprise at least one direction parameter and at least one energy ratio, wherein the apparatus caused to reproduce the two or more playback audio signals based on the at least one audio signal, the at least one spatial audio parameter and the at least one audio signal relationship parameter may further be caused to: determine a target covariance matrix from the at least one spatial audio parameter, the at least one coherence parameter and an estimated covariance matrix based on the at least one audio signal; generate a mixing matrix based on the target covariance matrix and estimated covariance matrix based on the at least one audio signal; and apply the mixing matrix to the at least one audio signal to generate at least two output spatial audio signals for reproducing the two or more playback audio signals.

The apparatus caused to determine a target covariance matrix from the at least one spatial audio parameter, the at least one audio signal relationship parameter and the estimated covariance matrix may be caused to: determine a total energy parameter based on the estimated covariance matrix; determine a direct energy and an ambience energy based on the total energy parameter and the at least one energy ratio; estimate an ambience covariance matrix based on the determined ambience energy and one of the at least one coherence parameters; estimate at least one of: a vector of amplitude panning gains; an Ambisonic panning vector or at least one head related transfer function, based on an output channel configuration and/or the at least one direction parameter; estimate a direct covariance matrix based on: the vector of amplitude panning gains, Ambisonic panning vector or the at least one head related transfer function; a determined direct part energy; and a further one of the at least one coherence parameters; and generate the target covariance matrix by combining the ambience covariance matrix and direct covariance matrix.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
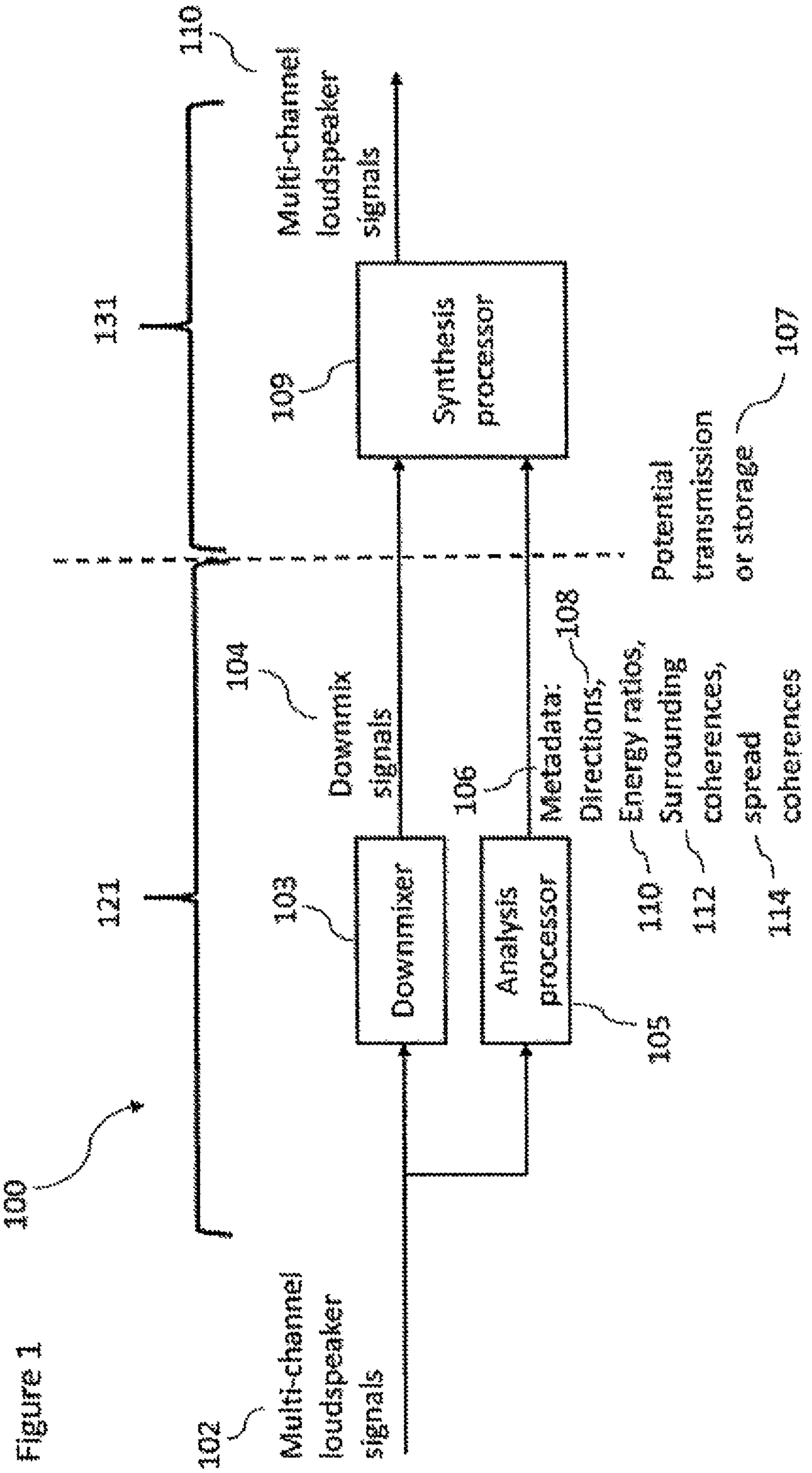
FIG. 1 shows schematically a system of apparatus suitable for implementing some embodiments.

The following describes in further detail suitable apparatus and possible mechanisms for the provision of effective spatial analysis derived metadata parameters for multichannel input format audio signals. In the following discussions multi-channel system is discussed with respect to a multi-channel loudspeaker implementation and as such a centre channel discussed as a 'centre loudspeaker'. However it is understood that in some embodiments the channel location or direction is a virtual location or direction and one which is then rendered to the user via means other than loudspeakers. Furthermore the multi-channel loudspeaker signals may be generalised to be two or more playback audio signals. As such the playback audio signals may include sources other than loudspeaker signals, for example microphone audio input signals.

As discussed previously spatial metadata parameters such as direction and direct-to-total energy ratio (or diffuseness-ratio, absolute energies, or any suitable expression indicating the directionality/non-directionality of the sound at the given time-frequency interval) parameters in frequency bands are particularly suitable for expressing the perceptual properties of natural sound fields. Synthetic sound scenes such as 5.1 loudspeaker mixes commonly utilize audio effects and amplitude panning methods that provide spatial sound that differs from sounds occurring in natural sound fields. In particular, a 5.1 or 7.1 mix may be configured such that it contains coherent sounds played back from multiple directions. For example, it is common that some sounds of a 5.1 mix perceived directly at the front are not produced by a centre (channel) loudspeaker, but for example coherently from left and right front (channels) loudspeakers, and potentially also from the centre (channel) loudspeaker. The spatial metadata parameters such as direction(s) and energy ratio(s) do not express such spatially coherent features accurately.

The reproduction of sounds coherently and simultaneously from multiple directions generates a perception that differs from the perception created by a single loudspeaker. For example, if the sound is reproduced coherently using the front left and right loudspeakers the sound can be perceived to be more "airy" than if the sound is only reproduced using the centre loudspeaker. Correspondingly, if the sound is reproduced coherently from front left, right, and centre loudspeakers, the sound may be described as being close or pressurized. Thus, the spatially coherent sound reproduction serves artistic purposes, such as adding presence for certain sounds (e.g., the lead singer sound). The coherent reproduction from several loudspeakers is sometimes also utilized for emphasizing low-frequency content.

The problem is that such spatial coherence of the audio signals is not expressed by the described spatial metadata. Therefore, the spatial coherence cannot be conveyed by such a codec if the spatial metadata is as described in the proposed implementations. If the spatially coherent sound is reproduced as a point source from one direction, it is perceived as narrow and less present. Also if the spatially coherent sound is reproduced as ambience, it is perceived soft, distant (and sometimes with artefacts due to the necessary decorrelation).

Neither of the above, nor an average of them, is a perceptually good solution for reproducing the spatially coherent sound.

The concept as discussed in further detail hereafter is the provision of methods and means to encode and decode the spatial coherence by adding specific analysis methods for 'synthetic' multi-channel audio input (for example with respect to 5.1 and 7.1 multi-channel input) sound and to provide an added related (at least one coherence) parameter in the metadata stream which can be provided along with the spatial metadata consisting of direction(s) and energy ratio(s).

As such the concepts as discussed in further detail with example implementations relate to audio encoding and decoding using a spatial audio or sound-field related parameterization (direction(s) and ratio(s) in frequency bands). The concept furthermore discloses a solution provided to improve the reproduction quality of loudspeaker surround mixes encoded with the aforementioned parameterization. The concept embodiments improve the quality of the loudspeaker surround mixes by analysing the at least two playback audio signals and determining at least one coherence parameter. For example the concept embodiments improve the quality of the loudspeaker surround mixes by analysing the inter-channel coherence of the loudspeaker signals in frequency bands, conveying a spatial coherence parameter(s) along with the directional parameter(s), and reproducing the sound based on the directional parameter(s) and the spatial coherence parameter(s), such that the spatial coherence affects the cross correlation of the reproduced audio signals. The term coherence here is not interpreted strictly as one specific similarity value between signals, such as the normalised, square-value but reflects similarity values between playback audio signals in general and may be complex (with phase), absolute, normalised, or square values. The coherence parameter may be expressed more generally as an audio signal relationship parameter indicating a similarity of audio signals in any way.

The cross correlation of the output signals may refer to the cross correlation of the reproduced loudspeaker signals, or of the reproduced binaural signals, or of the reproduced Ambisonic signals.

The discussed concept implementations therefore may provide two related solutions to two related issues:

- spatial coherence spanning an area in certain direction, which relates to the directional part of the sound energy;
- surrounding spatial coherence, which relates to the ambient/non-directional part of the sound energy.

Moreover, the ratio parameter may as discussed in further detail hereafter be modified based on the determined spatial coherence or audio signal relationship parameter(s) for further audio quality improvement.

In the example embodiments detailed below a typical scenario is described where the loudspeaker surround mix is a horizontal surround setup. In other embodiments spatial coherence or audio signal relationship parameters could be estimated also from "3D" loudspeaker configurations. In other words in some embodiments the spatial coherence or audio signal relationship parameters may be associated with directions located 'above' or 'below' a defined plane (e.g. elevated or depressed loudspeakers relative to a defined 'horizontal' plane).

There may be any degree of coherence between any of the channels in a loudspeaker mix. In theory, in order to accurately describe this perceptually, all information conveyed by the covariance matrix of the loudspeaker signals in frequency bands should be transmitted in the spatial metadata. The size of such a covariance matrix is N×N, where N is the number of loudspeaker channels. For a 5 channel system this would mean transmitting for each time-frequency analysis interval 10 complex cross-correlation values, for a 7 channel system 21 complex cross-correlation values and so on. Clearly, this would produce too much metadata for a suitable low-bit-rate codec. Hence in the following embodiments examples are described where only the perceptually essential aspects are described by the spatial metadata in order to keep the bit rate low.

For completeness, in a scope other than that of the present embodiments, a practical spatial audio encoder that would optimize transmission of the inter-channel relations of a loudspeaker mix would not transmit the whole covariance matrix of a loudspeaker mix, but provide a set of upmixing parameters to recover a surround sound signal at the decoder side that has a substantially similar covariance matrix than the original surround signal had. Solutions such as these have been employed in MPEG Surround and MPEG-H Part 3: 3D audio standards. However, such methods are specific of encoding and decoding only existing loudspeaker mixes. The present context is spatial audio encoding using the direction and ratio metadata that is a loudspeaker-setup independent parameterization in particular suited for captured spatial audio (and hence requires the present methods to improve the quality in case of loudspeaker surround inputs).

Thus the examples are focussed on solving the reproduction quality of 5.1 and 7.1 (and other format) channel loudspeaker mixes using the perceptually determined loudspeaker-setup independent parameterization methods as discussed hereafter.

Within actual 5.1 and 7.1 channel loudspeaker mixes, three typical cases of spatial coherence that are an issue related to the direction-ratio parameterization exist:

1) The sound is reproduced coherently using two loudspeakers for creating an “airy” perception (e.g., use front left and right instead of centre);

2) The sound is reproduced coherently using three (or more) loudspeakers for creating a “close” perception (e.g., use front left, right and centre instead of only centre); and 3) The sound is reproduced coherently from all (or nearly all) loudspeakers for creating an “inside-the-head” or “above” perception.

It is shown how to estimate and describe these three cases using only 2 parameters for each time-frequency interval (additionally to the already existing direction and direct-to-total ratio parameters). It is proposed that using this parameter set a similar spatial quality for the reproduced output can be obtained as by reproducing the spatial sound with the information contained by the whole covariance matrix.

It is also shown how to synthesize the spatial sound based on the proposed parameters, by adopting existing synthesis techniques known in the literature.

With respect to FIG. 1 an example apparatus and system for implementing embodiments of the application are shown. The system 100 is shown with an ‘analysis’ part 121 and a ‘synthesis’ part 131. The ‘analysis’ part 121 is the part from receiving the multi-channel loudspeaker signals up to an encoding of the metadata and downmix signal and the ‘synthesis’ part 131 is the part from a decoding of the encoded metadata and downmix signal to the presentation of the re-generated signal (for example in multi-channel loudspeaker form).

The input to the system 100 and the ‘analysis’ part 121 is the multi-channel loudspeaker signals 102. In the following examples a 5.1 channel loudspeaker signal input is described, however any suitable input loudspeaker (or synthetic multi-channel) format may be implemented in other embodiments.

The multi-channel loudspeaker signals are passed to a downmixer 103 and to an analysis processor 105.

In some embodiments the downmixer 103 is configured to receive the multi-channel loudspeaker signals and downmix the signals to a determined number of channels and output the downmix signals 104. For example the downmixer 103 may be configured to generate a 2 audio channel downmix of the multi-channel loudspeaker signals. The determined number of channels may be any suitable number of channels. In some embodiments the downmixer 103 is optional and the multi-channel loudspeaker signals are passed unprocessed to an encoder in the same manner as the downmix signal are in this example.

In some embodiments the analysis processor 105 is also configured to receive the multi-channel loudspeaker signals and analyse the signals to produce metadata 106 associated with the multi-channel loudspeaker signals and thus associated with the downmix signals 104. The analysis processor 105 can, for example, be a computer (running suitable software stored on memory and on at least one processor), or alternatively a specific device utilizing, for example, FPGAs or ASICs. As shown herein in further detail the metadata may comprise, for each time-frequency analysis interval, a direction parameter 108, an energy ratio parameter 110, a surrounding coherence parameter 112, and a spread coherence parameter 114. The direction parameter and the energy ratio parameters may in some embodiments be considered to be spatial audio parameters. In other words the spatial audio parameters comprise parameters which aim to characterize the sound-field created by the multi-channel loudspeaker signals (or two or more playback audio signals in general).

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The downmix signals 104 and the metadata 106 may be transmitted or stored, this is shown in FIG. 1 by the dashed line 107. Before the downmix signals 104 and the metadata 106 are transmitted or stored they are typically coded in order to reduce bit rate, and multiplexed to one stream. The encoding and the multiplexing may be implemented using any suitable scheme.

In the decoder side, the received or retrieved data (stream) may be demultiplexed, and the coded streams decoded in order to obtain the downmix signals and the metadata. This receiving or retrieving of the downmix signals and the metadata is also shown in FIG. 1 with respect to the right hand side of the dashed line 107.

The system 100 ‘synthesis’ part 131 shows a synthesis processor 109 configured to receive the downmix 104 and the metadata 106 and re-creates the multi-channel loudspeaker signals 110 (or in some embodiments any suitable output format such as binaural or Ambisonics signals, depending on the use case) based on the downmix signals 104 and the metadata 106. The synthesis processor 109 can in some embodiments be a computer (running suitable software stored on memory and on at least one processor), or alternatively a specific device utilizing, for example, FPGAs or ASICs.

Figure 4:
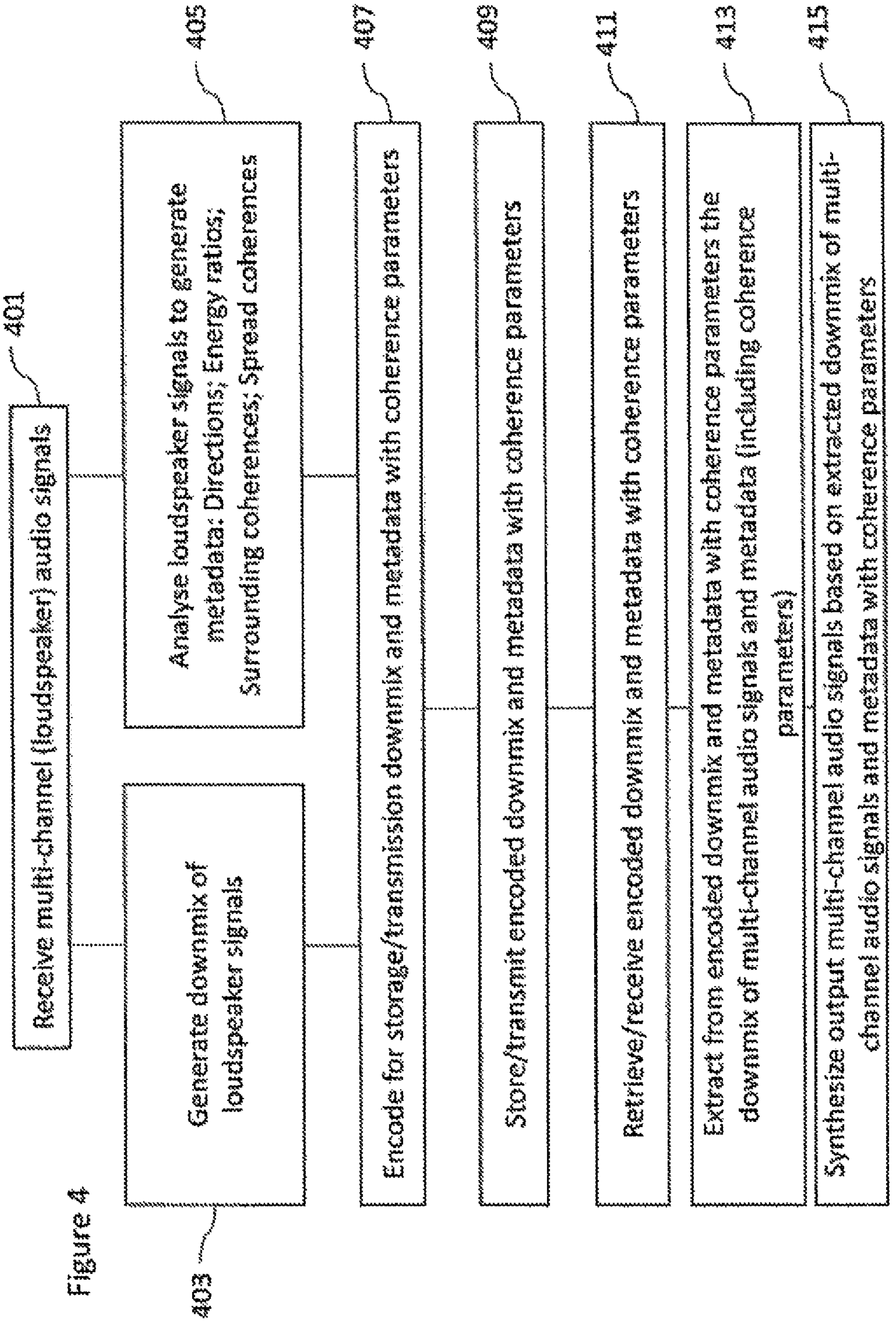
FIG. 4 shows a flow diagram of the operation of the system as shown in FIG. 1 according to some embodiments.

With respect to FIG. 4 an example flow diagram of the overview shown in FIG. 1 is shown.

First the system (analysis part) is configured to receive multi-channel (loudspeaker) audio signals as shown in FIG. 4 by step 401.

Then the system (analysis part) is configured to generate a downmix of loudspeaker signals as shown in FIG. 4 by step 403.

Also the system (analysis part) is configured to analyse loudspeaker signals to generate metadata: Directions; Energy ratios; Surrounding coherences; Spread coherences as shown in FIG. 4 by step 405.

The system is then configured to encode for storage/transmission the downmix signal and metadata with coherence parameters as shown in FIG. 4 by step 407.

After this the system may store/transmit the encoded downmix and metadata with coherence parameters as shown in FIG. 4 by step 409.

The system may retrieve/receive the encoded downmix and metadata with coherence parameters as shown in FIG. 4 by step 411.

Then the system is configured to extract from encoded downmix and metadata with coherence parameters as shown in FIG. 4 by step 413.

The system (synthesis part) is configured to synthesize an output multi-channel audio signal based on extracted downmix of multi-channel audio signals and metadata with coherence parameters as shown in FIG. 4 by step 415.

Figure 2:
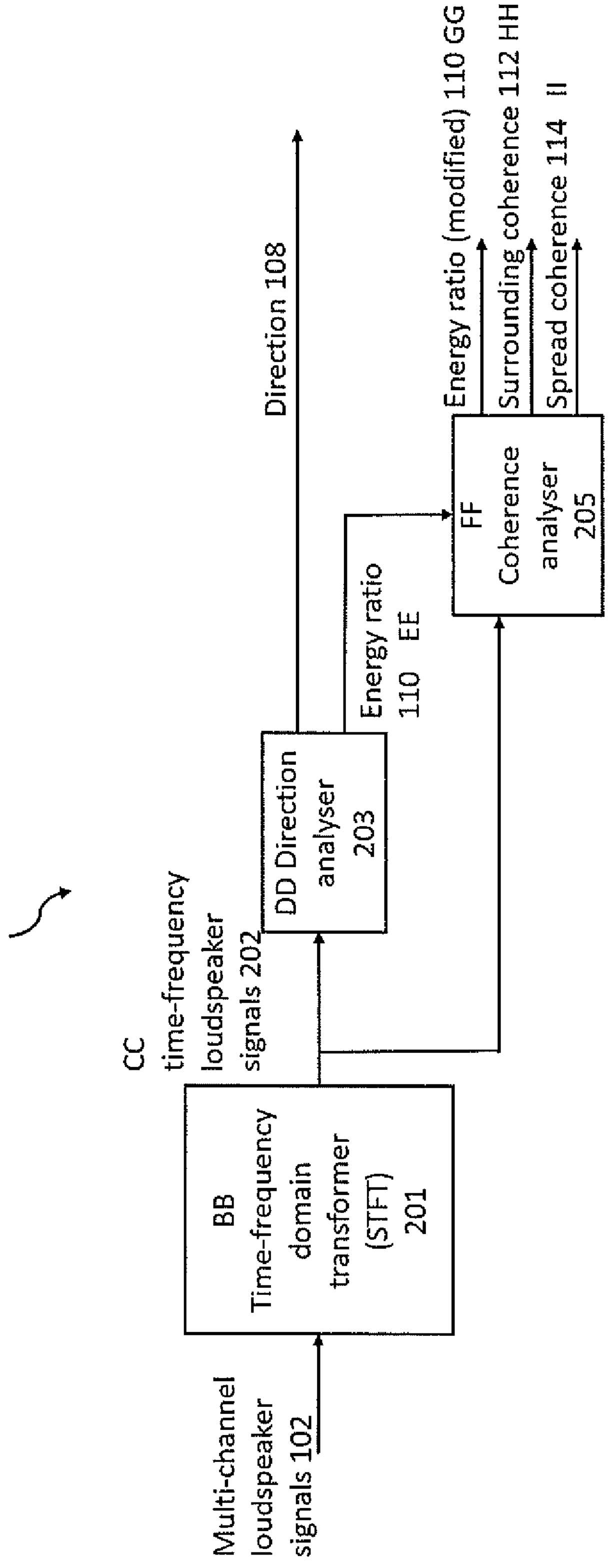
FIG. 2 shows schematically the analysis processor as shown in FIG. 1 according to some embodiments.

With respect to FIG. 2 an example analysis processor 105 (as shown in FIG. 1) according to some embodiments is described in further detail. The analysis processor 105 in some embodiments comprises a time-frequency domain transformer 201.

In some embodiments the time-frequency domain transformer 201 is configured to receive the multi-channel loudspeaker signals 102 and apply a suitable time to frequency domain transform such as a Short Time Fourier Transform (STFT) in order to convert the input time domain signals into a suitable time-frequency signals.

These time-frequency signals may be passed to a direction analyser 203 and to a coherence analyser 205.

Thus for example the time-frequency signals 202 may be represented in the time-frequency domain representation by $$s_i(b,n),$$

where b is the frequency bin index and n is the frame index and i is the loudspeaker channel index. In another expression, n can be considered as a time index with a lower sampling rate than that of the original time-domain signals. These frequency bins can be grouped into subbands that group one or more of the bins into a band index k=0, . . . , K−1. Each subband k has a lowest bin $b_{k,low}$ and a highest bin $b_{k,high}$, and the subband contains all bins from $b_{k,low}$ to $b_{k,high}$. The widths of the subbands can approximate any suitable distribution. For example the Equivalent rectangular bandwidth (ERB) scale or the Bark scale.

In some embodiments the analysis processor 105 comprises a direction analyser 203. The direction analyser 203 may be configured to receive the time-frequency signals 202 and based on these signals estimate direction parameters 108.

The direction parameters may be determined based on any audio based 'direction' determination.

For example in some embodiments the direction analyser 203 is configured to estimate the direction with two or more loudspeaker signal inputs. This represents the simplest configuration to estimate a 'direction', more complex processing may be performed with even more loudspeaker signals.

The direction analyser 203 may thus be configured to provide an azimuth for each frequency band and temporal frame, denoted as θ(k,n). Where the direction parameter is a 3D parameter an example direction parameter may be azimuth θ(k,n), elevation φ(k,n). The direction parameter 108 may be also be passed to a coherence analyser 205

In some embodiments further to the direction parameter the direction analyser 203 is configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter.

The estimated direction 108 parameters may be output (and to be used in the synthesis processor). The estimated energy ratio parameters 110 may be passed to a coherence analyser 205. The parameters may, in some embodiments, be received in a parameter combiner (not shown) where the estimated direction and energy ratio parameters are combined with the coherence parameters as generated by the coherence analyser 205 described hereafter.

In some embodiments the analysis processor 105 comprises a coherence analyser 205. The coherence analyser 205 is configured to receive parameters (such as the azimuths (θ(k, n)) 108, and the direct-to-total energy ratios (r(k, n)) 110) from the direction analyser 203. The coherence analyser 205 may be further configured to receive the time-frequency signals ($s_i$(b,n)) 202 from the time-frequency domain transformer 201. All of these are in the time-frequency domain; b is the frequency bin index, k is the frequency band index (each band potentially consists of several bins b), n is the time index, and i is the loudspeaker channel.

Although directions and ratios are here expressed for each time index n, in some embodiments the parameters may be combined over several time indices. Same applies for the frequency axis, as has been expressed, the direction of several frequency bins b could be expressed by one direction parameter in band k consisting of several frequency bins b. The same applies for all of the discussed spatial parameters herein.

The coherence analyser 205 is configured to produce a number of coherence parameters. In the following disclosure there are the two parameters: surrounding coherence (γ(k,n)) and spread coherence (ξ(k,n)), both analysed in time-frequency domain. In addition, in some embodiments the coherence analyser 205 is configured to modify the estimated energy ratios (r(k, n)).

Each of the aforementioned spatial coherence issues related to the direction-ratio parameterization are next discussed, and it is shown how the aforementioned new parameters are formed in each of the cases. All the processing is performed in the time-frequency domain, so the time-frequency indices k and n are dropped where necessary for brevity. As stated previously, in some cases the spatial metadata may be expressed in another frequency resolution than the frequency resolution of the time-frequency signal.

Let us first consider the situation discussed previously where the sound is reproduced coherently using two spaced loudspeakers (e.g., front left and right) instead of a single loudspeaker. The coherence analyser may be configured to detect that such a method has been applied in surround mixing.

In some embodiments therefore the coherence analyser 205 may be configured to calculate, the covariance matrix C for the given analysis interval consisting of one or more time indices n and frequency bins b. The size of the matrix is N×N, and the entries are denoted as $c_{ij}$, where i and j are loudspeaker channel indices.

Next, the coherence analyser 205 may be configured to determine the loudspeaker channel $i_c$ closest to the estimated direction (which in this example is azimuth θ).

$$i_c=\arg(\min(|\theta-\alpha_i|))$$

where $\alpha_i$ is the angle of the loudspeaker i.

Furthermore in such embodiments the coherence analyser 205 is configured to determine the loudspeakers closest on the left $i_l$ and the right $i_r$ side of the loudspeaker $i_c$.

A normalized coherence between loudspeakers i and j is denoted as $$c'_{ij}=\frac{|c_{ij}|}{\sqrt{|c_{ii}c_{jj}|}},$$

using this equation, the coherence analyser 205 may be configured to calculate a normalized coherence $c'_{lr}$ between $i_l$ and $i_r$. In other words calculate $$c'_{lr}=\frac{|c_{lr}|}{\sqrt{|c_{ll}c_{rr}|}},$$

Furthermore the coherence analyser 205 may configured to determine the energy of the loudspeaker channels i using the diagonal entries of the covariance matrix $$E_i=c_{ii},$$

and determine a ratio between the energies of the $i_l$ and $i_r$ loudspeakers and $i_l$, $i_r$, and $i_c$ loudspeakers as $$\xi_{lr/lrc}=\frac{E_l+E_r}{E_l+E_r+E_c}.$$

The coherence analyser 205 may then use these determined variables to generate a 'stereoness' parameter $$\mu=c'_{lr}\xi_{lr/lrc}.$$

This 'stereoness' parameter has a value between 0 and 1. A value of 1 means that there is coherent sound in loudspeakers $i_l$ and $i_r$ and this sound dominates the energy of this sector. The reason for this could, for example, be the loudspeaker mix used amplitude panning techniques for creating an "airy" perception of the sound. A value of 0 means that no such techniques has been applied, and, for example, the sound may simply be positioned to the closest loudspeaker.

Furthermore the coherence analyser may be configured to detect, or at least identify, the situation where the sound is reproduced coherently using three (or more) loudspeakers for creating a "close" perception (e.g., use front left, right and centre instead of only centre). This may be because a soundmixing engineer produces such a situation in surround mixing the multichannel loudspeaker mix.

In such embodiments the same loudspeakers $i_l$, $i_r$, and $i_c$ identified earlier are used by the coherence analyser to determine normalized coherence values $c'_{cl}$ and $c'_{cr}$ using the normalized coherence determination discussed earlier. In other words the following values are computed:

$$c'_{cl}=\frac{|c_{cl}|}{\sqrt{|c_{cc}c_{ll}|}},\quad c'_{cr}=\frac{|c_{cr}|}{\sqrt{|c_{cc}c_{rr}|}}.$$

The coherence analyser 205 may then determine a normalized coherence value $c'_{clr}$ depicting the coherence among these loudspeakers using the following:

$$c'_{clr}=\min(c'_{cl},c'_{cr}).$$

In addition, the coherence analyser may be configured to determine a parameter that depicts how evenly the energy is distributed between the channels $i_l$, $i_r$, and $i_c$, $$\xi_{clr}=\min\left(\frac{E_l}{E_c},\frac{E_c}{E_l},\frac{E_r}{E_c},\frac{E_c}{E_r}\right).$$

Using these variables, the coherence analyser may determine a new coherent panning parameter κ as, $$k=c'_{clr}\xi_{clr}.$$

This coherent panning parameter κ has values between 0 and 1. A value of 1 means that there is coherent sound in all loudspeakers $i_l$, $i_r$, and $i_c$, and the energy of this sound is evenly distributed among these loudspeakers. The reason for this could, for example, be because the loudspeaker mix was generated using studio mixing techniques for creating a perception of a sound source being closer. A value of 0 means that no such technique has been applied, and, for example, the sound may simply be positioned to the closest loudspeaker.

The coherence analyser determined stereoness parameter μ which measures the amount of coherent sound in $i_1$ and $i_r$ (but not in $i_c$), and coherent panning parameter κ which measures the amount of coherent sound in all $i_l$, $i_r$, and $i_c$ is configured to use these to determine coherence parameters to be output as metadata.

Thus the coherence analyser is configured to combine the stereoness parameter μ and coherent panning parameter κ to form a spread coherence ξ parameter, which has values from 0 to 1. A spread coherence ξ value of 0 denotes a point source, in other words, the sound should be reproduced with as few loudspeakers as possible (e.g., using only the loudspeaker i). As the value of the spread coherence (increases, more energy is spread to the loudspeakers around the loudspeaker $i_c$; until at the value 0.5, the energy is evenly spread among the loudspeakers $i_l$, $i_r$, and $i_c$. As the value of spread coherence (increases over 0.5, the energy in the loudspeaker $i_c$ is decreased; until at the value 1, there is no energy in the loudspeaker $i_c$, and all the energy is at loudspeakers $i_l$ and $i_r$.

Using the aforementioned parameters μ and κ, the coherence analyser is configured in some embodiments to determine a spread coherence parameter ξ, using the following expression:

$$\zeta=\begin{cases}\max(0.5,\mu-\kappa+0.5), & \text{if } \max(\mu,\kappa)>0.5\ \&\ \kappa>\mu\\ \max(\mu,\kappa), & \text{else}\end{cases}.$$

The above expression is an example only and it should be noted that the coherence analyser may estimate the spread coherence parameter $\xi$ in any other way as long as it complies with the above definition of the parameter.

As well as being configured to detect the earlier situations the coherence analyser may be configured to detect, or at least identify, the situation where the sound is reproduced coherently from all (or nearly all) loudspeakers for creating an "inside-the-head" or "above" perception.

In some embodiments coherence analyser may be configured to sort, the energies $E_i$, and the loudspeaker channel $i_e$ with the largest value determined.

The coherence analyser may then be configured to determine the normalized coherence $c'_{ij}$ between this channel and Mother loudest channels. These normalized coherence $c'_{ij}$ values between this channel and M other loudest channels may then be monitored. In some embodiments M may be N−1, which would mean monitoring the coherence between the loudest and all the other loudspeaker channels. However in some embodiments M may be a smaller number, e.g., N−2. Using these normalized coherence values, the coherence analyser may be configured to determine a surrounding coherence parameter $\gamma$ using the following expression:

$$\gamma = \min_{M}(c'_{i_e j}),$$

where $c'_{i_e j}$ are the normalized coherences between the loudest channel and M next loudest channels.

The surrounding coherence parameter $\gamma$ has values from 0 to 1. A value of 1 means that there is coherence between all (or nearly all) loudspeaker channels. A value of 0 means that there is no coherence between all (or even nearly all) loudspeaker channels.

The above expression is only one example of an estimate for a surrounding coherence parameter $\gamma$, and any other way can be used, as long as it complies with the above definition of the parameter.

The coherence analyser may as discussed above be used to estimate the surrounding coherence and spread coherence parameters. However in some embodiments and in order to improve the audio quality the coherence analyser may, having determined that the situations 1 (the sound is coherently using two loudspeakers for creating an "airy" perception and using front left and right instead of centre) and/or 2 (the sound is coherently using three (or more) loudspeakers for creating a "close" perception) occur within the loudspeaker signals, modify the ratio parameter r. Hence, in some embodiments the spread coherence and surrounding coherence parameters can also be used to modify the ratio parameter r.

As indicated above the energy ratio r is determined as a ratio between the energy of a point source at direction (which may be azimuth θ and/or elevation p), and the rest of the energy. If the sound source is produced as a point source in the surround mix (e.g., the sound is only in one loudspeaker), the direction analysis correctly produces the energy ratio of 1, and the synthesis stage will reproduce this sound as a point source. However, if audio mixing methods with coherent sound in multiple loudspeakers have been applied (such as the aforementioned cases 1 and 2), the direction analysis will produce lower energy ratios (as the sound is not a point source anymore). As a result, the synthesis stage will reproduce part of this sound as ambient, which may lead, for example, to a perception of faraway sound source contrary of the aim of the studio mixing engineer when generating the loudspeaker mix.

Thus in some embodiments the coherence analyser may be configured to modify the energy ratio if it is detected that audio mixing techniques have been used that distribute the sound coherently to multiple loudspeakers.

Thus in some embodiments the coherence analyser is configured to determine a ratio between the energy of loudspeakers $i_l$ and $i_r$ and all the loudspeakers, $$\xi_{lr/all} = \frac{E_l + E_r}{\sum E_i}.$$

Using this ratio, and the $c'_{lr}$ and $\gamma$ as determined above, an alternative energy ratio $r_s$ is generated by the coherence analyser, $$r_s = c'_{lr}\xi_{lr/all} - \gamma.$$

In some embodiments the coherence analyser may be similarly configured to determine a ratio between the energy of loudspeakers $i_l$, $i_r$, and $i_c$ and all the loudspeakers, $$\xi_{clr/all} = \frac{E_c + E_l + E_r}{\sum E_i}.$$

Using this ratio, and the $c'_{clr}$ and $\gamma$ computed above, a further alternative energy ratio $r_c$ is formed by the coherence analyser, $$r_c = c'_{clr}\xi_{clr/all} - \gamma.$$

Using these energy ratios, the original energy ratio r can be modified by the coherence analyser to be, $$r' = \max(r, r_s, r_c).$$

This modified energy ratio r' can be used to replace the original energy ratio r. As a result, for example, in the situation 1 (the sound is coherently using two loudspeakers for creating an "airy" perception and using front left and right instead of centre), the ratio r' will be close to 1 (and the spread coherence $\xi$ also close to 1). As discussed later in the synthesis phase, the sound will be reproduced coherently from loudspeakers $i_l$ and $i_r$ without any decorrelation. Thus, the perception of the reproduced sound will match the original mix.

These (modified) energy ratios 110, surrounding coherence 112 and spread coherence 114 parameters may then be output. As discussed these parameters may be passed to a metadata combiner or be processed in any suitable manner, for example encoding and/or multiplexing with the downmix signals and stored and/or transmitted (and be passed to the synthesis part of the system).

With respect to FIGS. 5, 6*a*, 6*b*, and 6*c* are shown flow diagrams summarising the operations described above.

Figure 5:
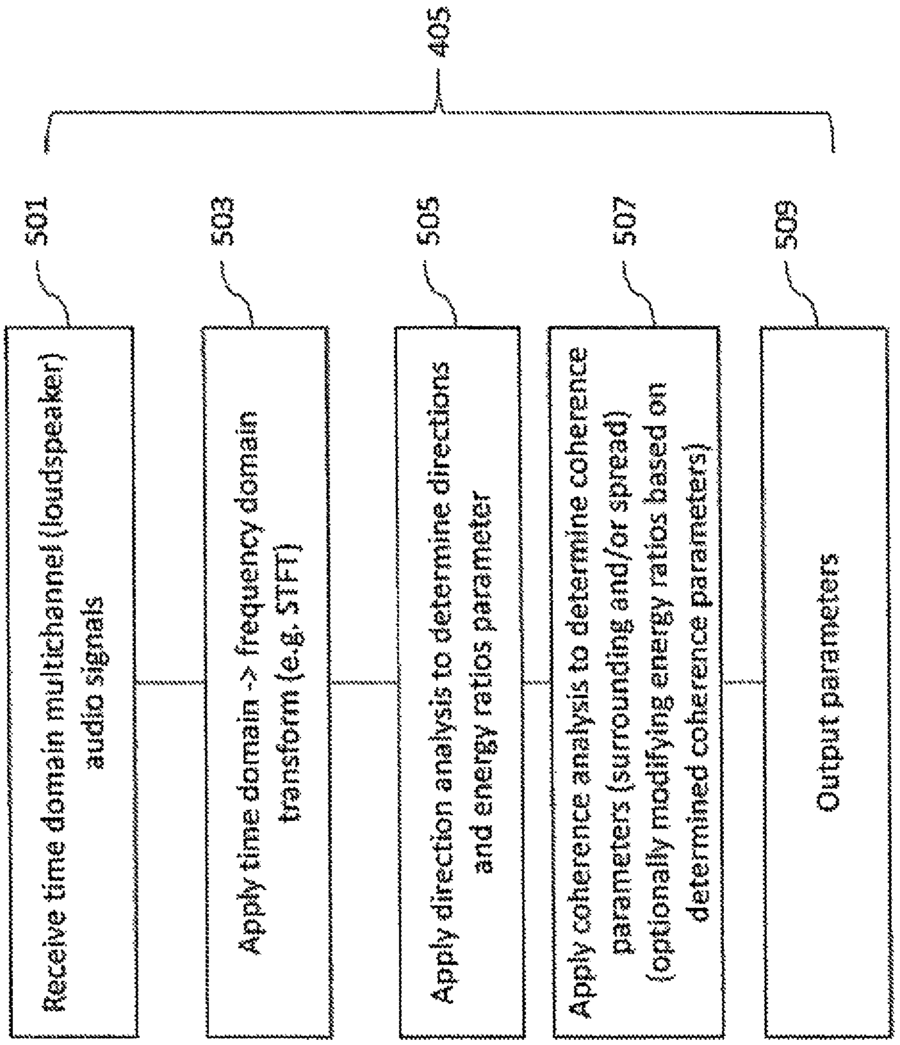
FIG. 5 shows a flow diagram of the operation of the analysis processor as shown in FIG. 2 according to some embodiments.

Thus for example FIG. 5 shows an example overview of the operation of the analysis processor 105.

The first operation is one of receiving time domain multichannel (loudspeaker) audio signals as shown in FIG. 5 by step 501.

Following this is applying a time domain to frequency domain transform (e.g. STFT) to generate suitable time-frequency domain signals for analysis as shown in FIG. 5 by step 503.

Then applying direction analysis to determine direction and energy ratio parameters is shown in FIG. 5 by step 505.

Then applying coherence analysis to determine coherence parameters such as surrounding and/or spread coherence parameters is shown in FIG. 5 by step 507. In some embodiments the energy ratio may also be modified based on the determined coherence parameters in this step.

The final operation being one of outputting the determined parameters is shown in FIG. 5 by step 509.

Figure 6A:
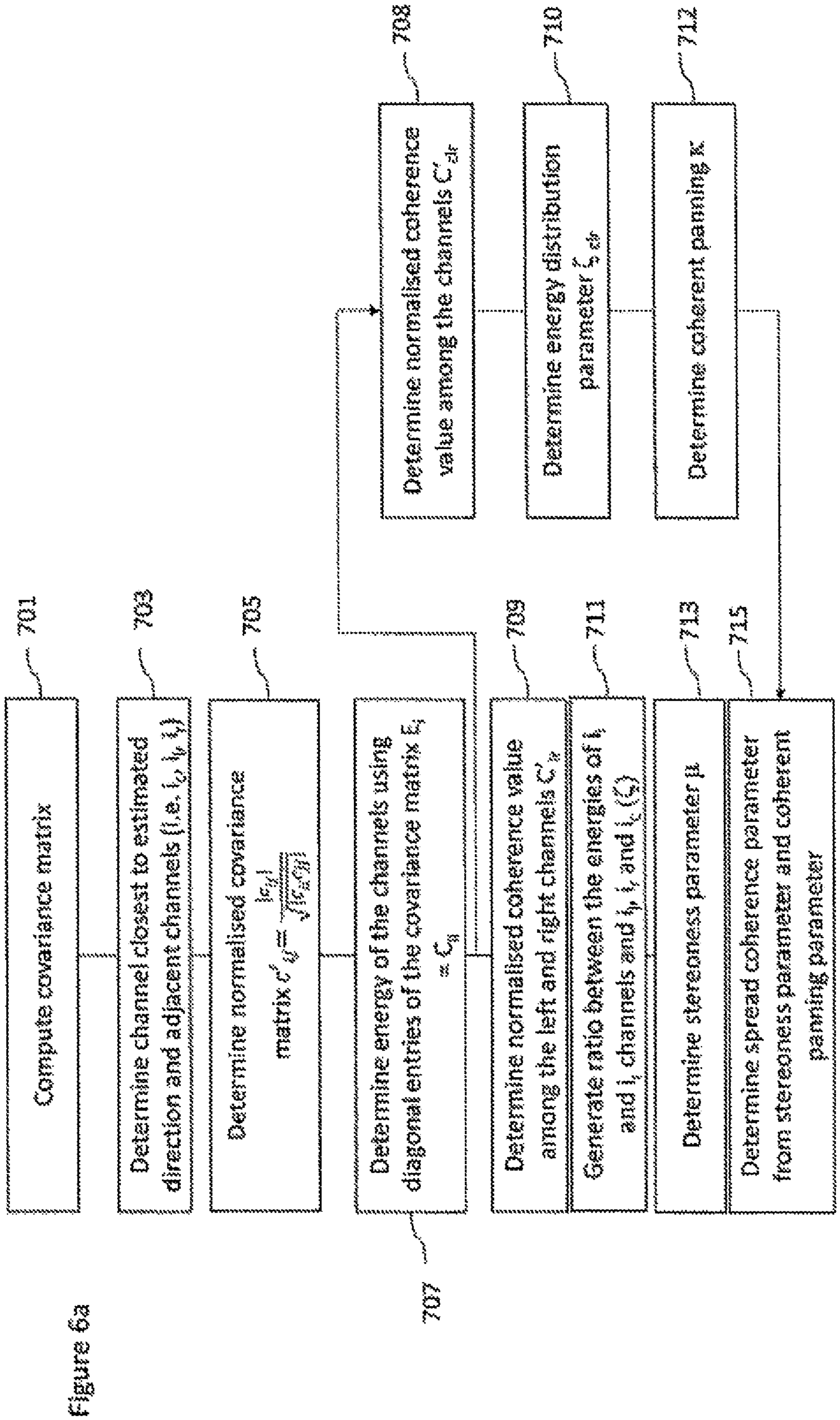
FIG. 6*a* shows a flow diagram of an example operation of generating the spread coherence parameter in further detail.

With respect to FIG. 6*a* is an example method for generating a spread coherence parameter.

The first operation is computing a covariance matrix as shown in FIG. 6*a* by step 701.

The following operation is determining the channel closest to estimated direction and adjacent channels (i.e. $i_c$, $i_l$, $i_r$) as shown in FIG. 6*a* by step 703.

The next operation is normalising the covariance matrix as shown in FIG. 6*a* by step 705.

The method may then comprise determining energy of the channels using diagonal entries of the covariance matrix as shown in FIG. 6*a* by step 707.

Then the method may comprise determining a normalised coherence value among the left and right channels as shown in FIG. 6*a* by step 709.

The method may comprise generating a ratio between the energies of $i_l$ and $i_r$ channels and $i_l$, $i_r$ and $i_c$ as shown in FIG. 6*a* by step 711.

Then a stereoness parameter may be determined as shown in FIG. 6*a* by step 713.

Also in parallel with steps 707 to 713 the method may comprise determining a normalised coherence value among the channels as shown in FIG. 6*a* by step 708, determining an energy distribution parameter as shown in FIG. 6*a* by step 710 and determining a coherent panning parameter as shown in FIG. 6*a* by step 712.

Finally the operation may determine spread coherence parameter from the stereoness parameter and the coherent panning parameter as shown in FIG. 6*a* by step 713.

Figure 6B:
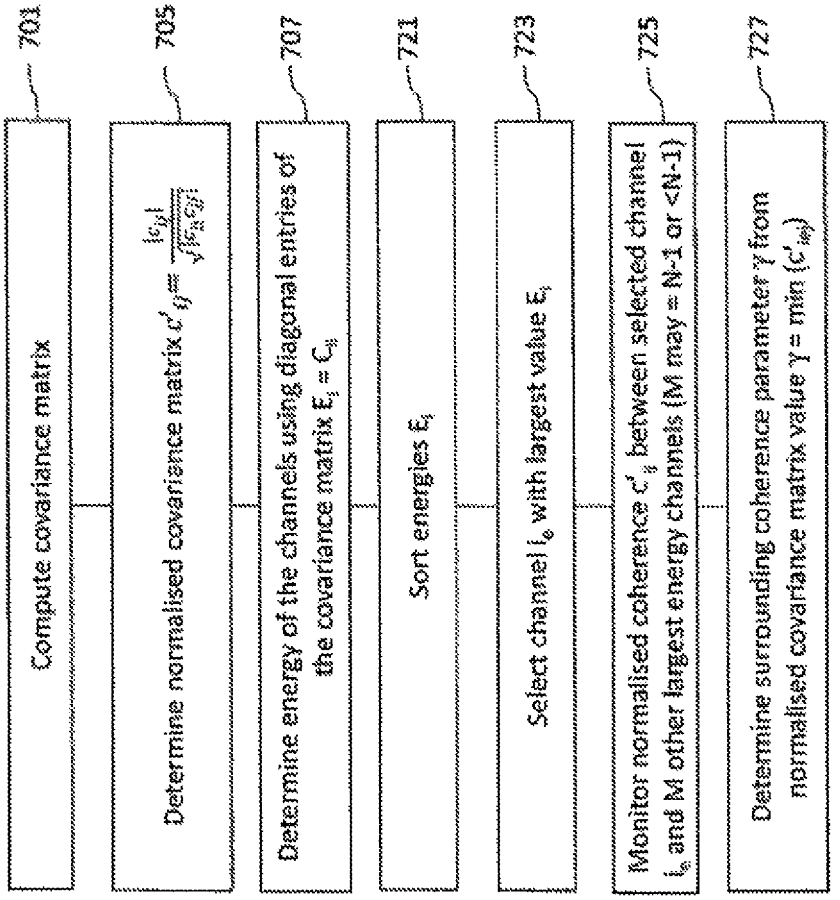
FIG. 6*b* shows a flow diagram of an example operation of generating the surrounding coherence parameter in further detail.

Furthermore FIG. 6*b* shows an example method for generating a surrounding coherence parameter.

The first three operations are the same as three of the first four operations shown in FIG. 6*a* in that first is computing a covariance matrix as shown in FIG. 6*b* by step 701.

The next operation is normalising the covariance matrix as shown in FIG. 6*b* by step 705.

The method may then comprise determining energy of the channels using diagonal entries of the covariance matrix as shown in FIG. 6*b* by step 707.

Then the method may comprise sorting energies $E_l$ as shown in FIG. 6*b* by step 721.

Then the method may comprise selecting channel with largest value as shown in FIG. 6*b* by step 723.

The method may then comprise monitoring a normalised coherence between the selected channel and M other largest energy channels as shown in FIG. 6*b* by step 725.

Then determining surrounding coherence parameter from the normalised covariance matrix values as shown in FIG. 6*b* by step 727.

Figure 6C:
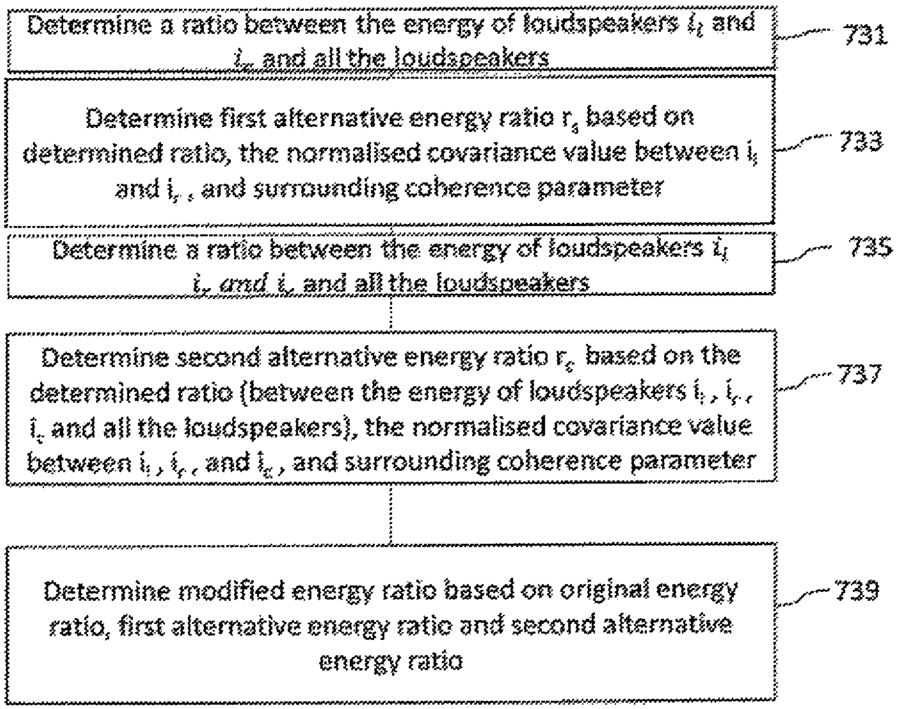
FIG. 6*c* shows a flow diagram of an example operation of modifying the energy ratio parameter in further detail.

With respect to FIG. 6*c* an example method for modifying the energy ratio is shown.

The first operation is determining a ratio between the energy of loudspeakers ii and $i_r$ and all the loudspeakers as shown in FIG. 6*c* by step 731.

Then determining a first alternative ratio $r_s$ based on this ratio and the $c'_{lr}$ and γ as determined above, by the coherence analyser is shown in FIG. 6*c* by step 733.

The next operation is determining a ratio between the energy of loudspeakers $i_l$ and $i_r$ and $i_c$ and all the loudspeakers as shown in FIG. 6*c* by step 735.

Then determining a second alternative ratio $r_c$ based on this ratio and the $c'_{clr}$ and γ as determined above, by the coherence analyser is shown in FIG. 6*c* by step 737.

A modified energy ratio may then be determined based on original energy ratio, first alternative energy ratio and second alternative energy ratio, as shown in FIG. 6*c* by step 739 and used to replace the current energy ratio.

The above formulation was detailed to estimate the coherence parameters for surround loudspeaker input. Similar processing can be also performed for audio object input, by treating the audio objects as audio channels at determined positions at each temporal parameter estimation interval.

Furthermore, the coherence parameters such as spread and surround coherence parameters could be estimated also for microphone array signals or Ambisonic input signals. As an example, from some microphone arrays the method and apparatus may obtain first-order Ambisonic (FOA) signals by methods known in the literature. FOA signals consist of an omnidirectional signal and three orthogonally aligned figure-of-eight signals having a positive gain at one direction and a negative gain at another direction. In one example of coherence parameter estimation for such an input, the method and apparatus may monitor the relative energies of the omnidirectional and the three directional signals of the FOA signal. This is since if a sound is reproduced from surrounding directions coherently and a FOA signal is captured, the omnidirectional ($0^{th}$ order FOA) signal consists of a sum of these coherent signals. On the contrary, the three figure-of-eight ($1^{st}$ order FOA) signals have positive and negative gains direction-dependently, and thus the coherent signals will partially or completely cancel each other at these $1^{st}$ order FOA signals. Therefore, the surround coherence parameter could be estimated such that a higher value is provided when the energy of the $0^{th}$ order FOA signal becomes higher with respect to the combined energy of the $1^{st}$ order FOA signals.

Figure 3:
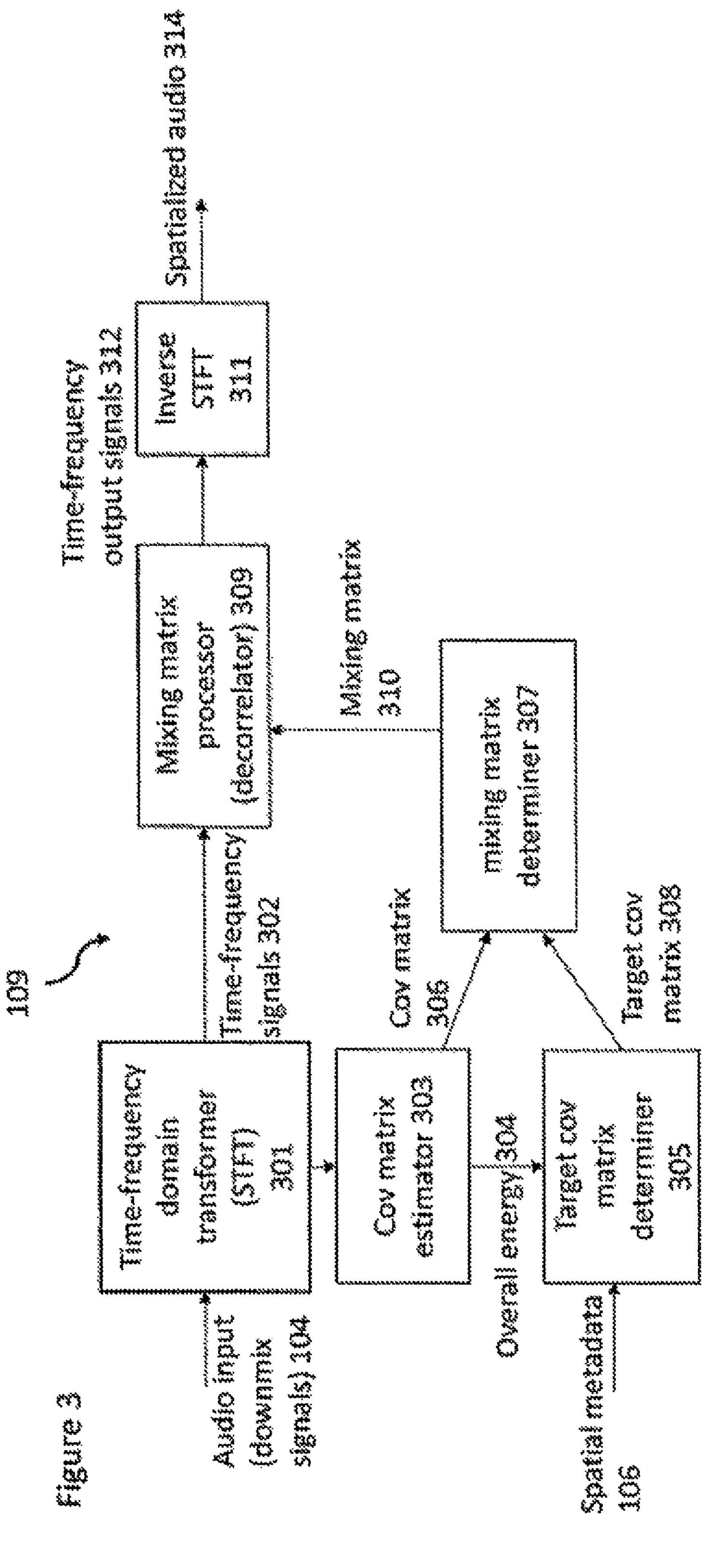
FIG. 3 shows schematically the synthesis processor as shown in FIG. 1 according to some embodiments.

With respect to FIG. 3, an example synthesis processor 109 is shown in further detail. The example synthesis processor 109 may be configured to utilize a modified method such as detailed in: US20140233762A1 "Optimal mixing matrices and usage of decorrelators in spatial audio processing", Vilkamo, Bäckström, Kuntz, Küch.

The cited method may be selected for the reason that it is particularly suited for such cases where the inter-channel signal coherences require to be synthesized or manipulated.

The synthesis method may be a modified least-squares optimized signal mixing technique to manipulate the covariance matrix of a signal, while attempting to preserve audio quality. The method utilizes the covariance matrix measure of the input signal and a target covariance matrix (as discussed below), and provides a mixing matrix to perform such processing. The method also provides means to optimally utilize decorrelated sound when there is no sufficient amount of independent signal energy at the inputs.

A synthesis processor 109 may receive the downmix signals 104 and the metadata 106.

The synthesis processor 109 may comprise a time-frequency domain transformer 301 configured to receive the downmix signals 104 and apply a suitable time to frequency domain transform such as a Short Time Fourier Transform (STFT) in order to convert the input time domain signals into a suitable time-frequency signals. These time-frequency signals, the time-frequency signals may be passed to a mixing matrix processor 309 and covariance matrix estimator 303.

The time-frequency signals may then be processed adaptively in frequency bands with a mixing matrix processor (and potentially also decorrelation processor) 309, and the result in the form of time-frequency output signals 312 is transformed back to the time domain to provide the processed output in the form of spatialized audio signals 314. The mixing matrix processing methods are well documented, for example in Vilkamo, Bäckström, and Kuntz. "Optimized covariance domain framework for time-frequency processing of spatial audio." Journal of the Audio Engineering Society 61.6 (2013): 403-411.

To apply the mixing matrix processing, a mixing matrix 310 in frequency bands is required. The mixing matrix 310 may in some embodiments be formulated within a mixing matrix determiner 307. The mixing matrix determiner 307 is configured to receive input covariance matrices 306 in frequency bands and target covariance matrices 308 in frequency bands.

The covariance matrices 306 in frequency bands is simply determined in the covariance matrix estimator 303 and measured from the downmix signals in frequency bands from the time-frequency domain transformer 301.

The target covariance matrix is formulated in some embodiments in a target covariance matrix determiner 305.

The target covariance matrix determiner 305 in some embodiments is configured to determine the target covariance matrix for reproduction to surround loudspeaker setups. In the following expressions the time and frequency indices n and k are removed for simplicity (when not necessary).

First the target covariance matrix determiner 305 may be configured to estimate the overall energy E 304 of the target covariance matrix based on the input covariance matrix from the covariance matrix estimator 303. The overall energy E may in some embodiments may be determined from the sum of the diagonal elements of the input covariance matrix.

The target covariance matrix determiner 305 may then be configured to determine the target covariance matrix $C_T$ in mutually incoherent parts, the directional part $C_D$ and the ambient or non-directional part $C_A$.

The target covariance matrix is thus determined by the target covariance matrix determiner 305 as $C_T=C_D+C_A$.

The ambient part $C_A$ expresses the spatially surrounding sound energy, which previously has been only incoherent, but due to the present invention it may be incoherent or coherent, or partially coherent.

The target covariance matrix determiner 305 may thus be configured to determine the ambience energy as (1−r)E, where r is the direct-to-total energy ratio parameter from the input metadata. Then, the ambience covariance matrix can be determined by, $$C_A = (1-r)E\frac{((1-\gamma)I_{M\times M} + \gamma U_{M\times M})}{M},$$

where I is an identity matrix and U is a matrix of ones, and M is the number of output channels. In other words, when γ is zero, then the ambience covariance matrix $C_A$ is diagonal, and when γ is one, then the ambience covariance matrix is such that determines that all channel pairs to be coherent.

The target covariance matrix determiner 305 may next be configured to determine the direct part covariance matrix Co.

The target covariance matrix determiner 305 can thus be configured to determine the direct part energy as rE.

Then the target covariance matrix determiner 305 is configured to determine a gain vector for the loudspeaker signals based on the metadata. First, the target covariance matrix determiner 305 is configured to determine a vector of the amplitude panning gains for the loudspeaker setup and the direction information of the spatial metadata, for example, using the vector base amplitude panning (VBAP). These gains can be denoted in a column vector $v_{VBAP}$, which for a horizontal setup has in maximum only two non-zero values for the two loudspeakers active in the amplitude panning.

The target covariance matrix determiner 305 can in some embodiments be configured to determine the VBAP covariance matrix as, $$C_{VBAP}=v_{VBAP}v_{VBAP}^H.$$

The target covariance matrix determiner 305 can be configured, in a similar manner to the analysis part, to determine the channel triplet $i_l$, $i_r$, $i_c$ which are the loudspeakers nearest to the estimated direction, and the nearest left and right loudspeakers.

The target covariance matrix determiner 305 may furthermore be configured to determine a panning column vector $v_{LRC}$ being otherwise zero, but having values $\sqrt{1/3}$ at the indices $i_l$, $i_r$, $i_c$. The covariance matrix for that vector is $$C_{LRC}=v_{LRC}v_{LRC}^H.$$

When the spread coherence parameter is less than 0.5, i.e., when the sound is between "direct point source" and "three-loudspeakers coherent sound", the target covariance matrix determiner 305 can be configured to determine the direct part covariance matrix to be $$C_D=rE((1-2\xi)C_{VBAP}+2\xi C_{LRC}).$$

When the spread coherence parameter ξ is between 0.5 and 1, i.e., when the sound is between "three-loudspeakers coherent sound" and "two spread loudspeakers coherent sound", the target covariance matrix determiner 305 can determine a spread distribution vector $$v_{DISTR,3} = \begin{bmatrix} (2-2\zeta) \\ 1 \\ 1 \end{bmatrix} \frac{1}{\sqrt{(2-2\zeta)^2+2}}.$$

Then the target covariance matrix determiner 305 can be configured to determine a panning vector $v_{DISTR}$ where the $i_c$th entry is the first entry of $v_{DISTR,3}$, and $i_l$th and $i_r$th entries are the second and third entries of $v_{DISTR,3}$. The direct part covariance matrix may then be calculated by the target covariance matrix determiner 305 to be, $$C_D=rE(v_{DISTR}v_{DISTR}^H).$$

The target covariance matrix determiner 305 may then obtain the target covariance matrix $C_T=C_D+C_A$ to process the sound. As expressed above, the ambience part covariance matrix thus accounts for the ambience energy and the spatial coherence contained by the surrounding coherence parameter γ, and the direct covariance matrix accounts for the directional energy, the direction parameter, and the spread coherence parameter ξ.

The target covariance matrix determiner 305 may be configured to determine a target covariance matrix 308 for a binaural output by being configured to synthesize inter-aural properties instead of inter-channel properties of surround sound.

Thus the target covariance matrix determiner 305 may be configured to determine, the ambience covariance matrix $C_A$ for the binaural sound. The amount of ambient or non-directional energy is (1−r)E, where E is the total energy as determined previously. The ambience part covariance matrix can be determined as $$C_A(k,n) = (1 - r(k,n))E(k,n)\begin{bmatrix} 1 & c(k,n) \\ c(k,n) & 1 \end{bmatrix},$$

where $$c(k,n) = \gamma(k,n) + (1 - \gamma(k,n))c_{bin}(k),$$

and where $c_{bin}(k)$ is the binaural diffuse field coherence for the frequency of kth frequency index. In other words, when γ(k,n) is one, then the ambience covariance matrix $C_A$ is such that determines full coherence between the left and right ears. When γ(k,n) is zero, then $C_A$ is such that determines the coherence between left and right ears that is natural for a human listener in a diffuse field (roughly: zero at high frequencies, high at low frequencies).

Then the target covariance matrix determiner 305 may be configured to determine the direct part covariance matrix $C_D$. The amount of directional energy is rE. It is possible to use similar methods to synthesize the spread coherence parameter ξ as in the loudspeaker reproduction, detailed below.

First the target covariance matrix determiner 305 may be configured to determine a 2×1 HRTF-vector $v_{HRTF}(k,\theta(k,n))$, where θ(k,n) is the estimated direction parameter. The target covariance matrix determiner 305 can determine a panning HRTF vector that is equivalent to reproducing sound coherently at three directions $$v_{LRC\_HRTF}(k,\theta(k,n)) = \frac{v_{HRTF}(k,\theta(k,n)) + v_{HRTF}(k,\theta(k,n)+\theta_\Delta) + v_{HRTF}(k,\theta(k,n)-\theta_\Delta)}{\sqrt{3}},$$

where the $\theta_\Delta$ parameter defines the width of the "spread" sound energy with respect to the azimuth dimension. It could be, for example, 30 degrees.

When the spread coherence parameter ξ is less than 0.5, i.e., when the sound is between "direct point source" and "three-loudspeakers coherent sound" the target covariance matrix determiner 305 can be configured to determine the direct part HRTF covariance matrix to be, $$C_D = rE((1-2\xi)v_{HRTF}v_{HRTF}^H + 2\xi v_{LRC\_HRTF}v_{LRC\_HRTF}^H).$$

When the spread coherence parameter ξ is between 0.5 and 1, i.e., when the sound is between "three-loudspeakers coherent sound" and "two spread loudspeakers coherent sound", the target covariance matrix determiner 305 can determine a spread distribution by re-utilizing the amplitude-distribution vector $v_{DISTR,3}$ (same as in the loudspeaker rendering). A combined head related transfer function (HRTF) vector can then be determined as $$v_{DISTR\_HRTF}(k,\theta(k,n)) = [v_{HRTF}(k,\theta(k,n))\, v_{HRTF}(k,\theta(k,n)+\theta_\Delta)\, v_{HRTF}(k,\theta(k,n)-\theta\Delta)]v_{DISTR,3}.$$

The above formula produces the weighted sum of the three HRTFs with the weights in $v_{DISTR,3}$. The direct part HRTF covariance matrix is then $$C_D = rE(v_{DISTR\_HRTF}v_{DISTR\_HRTF}^H).$$

Then, the target covariance matrix determiner 305 is configured to obtain the target covariance matrix $C_T = C_D + C_A$ to process the sound. As expressed above, the ambience part covariance matrix thus accounts for the ambience energy and the spatial coherence contained by the surrounding coherence parameter γ, and the direct covariance matrix accounts for the directional energy, the direction parameter, and the spread coherence parameter ξ.

The target covariance matrix determiner 305 may be configured to determine a target covariance matrix 308 for an Ambisonic output by being configured to synthesize inter-channel properties of the Ambisonic signals instead of inter-channel properties of loudspeaker surround sound. The first-order Ambisonic (FOA) output is exemplified in the following, however, it is straightforward to extend the same principles to higher-order Ambisonic output as well.

Thus the target covariance matrix determiner 305 may be configured to determine, the ambience covariance matrix $C_A$ for the Ambisonic sound. The amount of ambient or non-directional energy is (1−r)E, where E is the total energy as determined previously. The ambience part covariance matrix can be determined as $$C_A = (1-r)E\left((1-\gamma)\begin{bmatrix} 1 & 0 & 0 & 0 \\ 0 & \frac{1}{3} & 0 & 0 \\ 0 & 0 & \frac{1}{3} & 0 \\ 0 & 0 & 0 & \frac{1}{3} \end{bmatrix} + \gamma\begin{bmatrix} 1 & 0 & 0 & 0 \\ 0 & 0 & 0 & 0 \\ 0 & 0 & 0 & 0 \\ 0 & 0 & 0 & 0 \end{bmatrix}\right),$$

In other words, when γ(k,n) is one, then the ambience covariance matrix $C_A$ is such that only the $0^{th}$ order component receives a signal. The meaning of such an Ambisonic signal is reproduction of the sound spatially coherently. When γ(k,n) is zero, then $C_A$ corresponds to an Ambisonic covariance matrix in a diffuse field. The normalization of the $0^{th}$ and $1^{st}$ order elements above is according to the known SN3D normalization scheme.

Then the target covariance matrix determiner 305 may be configured to determine the direct part covariance matrix Co. The amount of directional energy is rE. It is possible to use similar methods to synthesize the spread coherence parameter ξ as in the loudspeaker reproduction, detailed below.

First the target covariance matrix determiner 305 may be configured to determine a 4×1 Ambisonic panning vector $v_{Amb}(\theta(k,n))$, where θ(k,n) is the estimated direction parameter. The Ambisonic panning vector $v_{Amb}(\theta(k,n))$ contains the Ambisonic gains corresponding to direction θ(k, n). For FOA output with direction parameter at the horizontal plane (using the known ACN channel ordering scheme)

$$v_{Amb}(\theta(k,n)) = \begin{bmatrix} 1 \\ \sin(\theta(k,n)) \\ 0 \\ \cos(\theta(k,n)) \end{bmatrix}.$$

The target covariance matrix determiner 305 can determine a panning Ambisonic vector that is equivalent to reproducing sound coherently at three directions $$v_{LRC\_Amb}(\theta(k,n)) = \frac{v_{Amb}(\theta(k,n)) + v_{Amb}(\theta(k,n)+\theta_\Delta) + v_{Amb}(\theta(k,n)-\theta_\Delta)}{\sqrt{3}},$$

where the $\theta_\Delta$ parameter defines the width of the "spread" sound energy with respect to the azimuth dimension. It could be, for example, 30 degrees.

When the spread coherence parameter $\xi$ is less than 0.5, i.e., when the sound is between "direct point source" and "three-loudspeakers coherent sound" the target covariance matrix determiner 305 can be configured to determine the direct part Ambisonic covariance matrix to be, $$C_D=rE((1-2\xi)v_{Amb}v_{Amb}^H+2\xi v_{LRC\_Amb}v_{LRC\_Amb}^H).$$

When the spread coherence parameter $\xi$ is between 0.5 and 1, i.e., when the sound is between "three-loudspeakers coherent sound" and "two spread loudspeakers coherent sound", the target covariance matrix determiner 305 can determine a spread distribution by re-utilizing the amplitude-distribution vector $v_{DISTR,3}$ (same as in the loudspeaker rendering). A combined Ambisonic panning vector can then be determined as $$v_{DISTR\_Amb}(\theta(k,n))=[v_{Amb}(\theta(k,n))v_{Amb}(\theta(k,n)+\theta_\Delta)v_{Amb}(\theta(k,n)-\theta_\Delta)]v_{DISTR,3}.$$

The above formula produces the weighted sum of the three Ambisonic panning vectors with the weights in $v_{DISTR,3}$. The direct part Ambisonic covariance matrix is then $$C_D=rE(v_{DISTR\_Amb}v_{DISTR\_Amb}^H).$$

Then, the target covariance matrix determiner 305 is configured to obtain the target covariance matrix $C_T=C_D+C_A$ to process the sound. As expressed above, the ambience part covariance matrix thus accounts for the ambience energy and the spatial coherence contained by the surrounding coherence parameter $\gamma$, and the direct covariance matrix accounts for the directional energy, the direction parameter, and the spread coherence parameter $\xi$.

In other words, the same general principles apply in constructing the binaural or Ambisonic or loudspeaker target covariance matrix. The main difference is to utilize HRTF data or Ambisonic panning data instead of loudspeaker amplitude panning data in the rendering of the direct part, and to utilize binaural coherence (or specific Ambisonic ambience covariance matrix handling) instead of inter-channel (zero) coherence in rendering the ambient part. It would be understood that a processor may be able to run software implementing the above and thus be able to render each of these output types.

In the above formulas the energies of the direct and ambient parts of the target covariance matrices were weighted based on a total energy estimate E from the estimated input covariance matrix. Optionally, such weighting can be omitted, i.e., the direct part energy is determined as r, and the ambience part energy as (1−r). In that case, the estimated input covariance matrix is instead normalized with the total energy estimate, i.e., multiplied with 1/E. The resulting mixing matrix based on such determined target covariance matrix and normalized input covariance matrix may exactly or practically be the same than with the formulation provided previously, since the relative energies of these matrices matter, not their absolute energies.

Figure 7A:
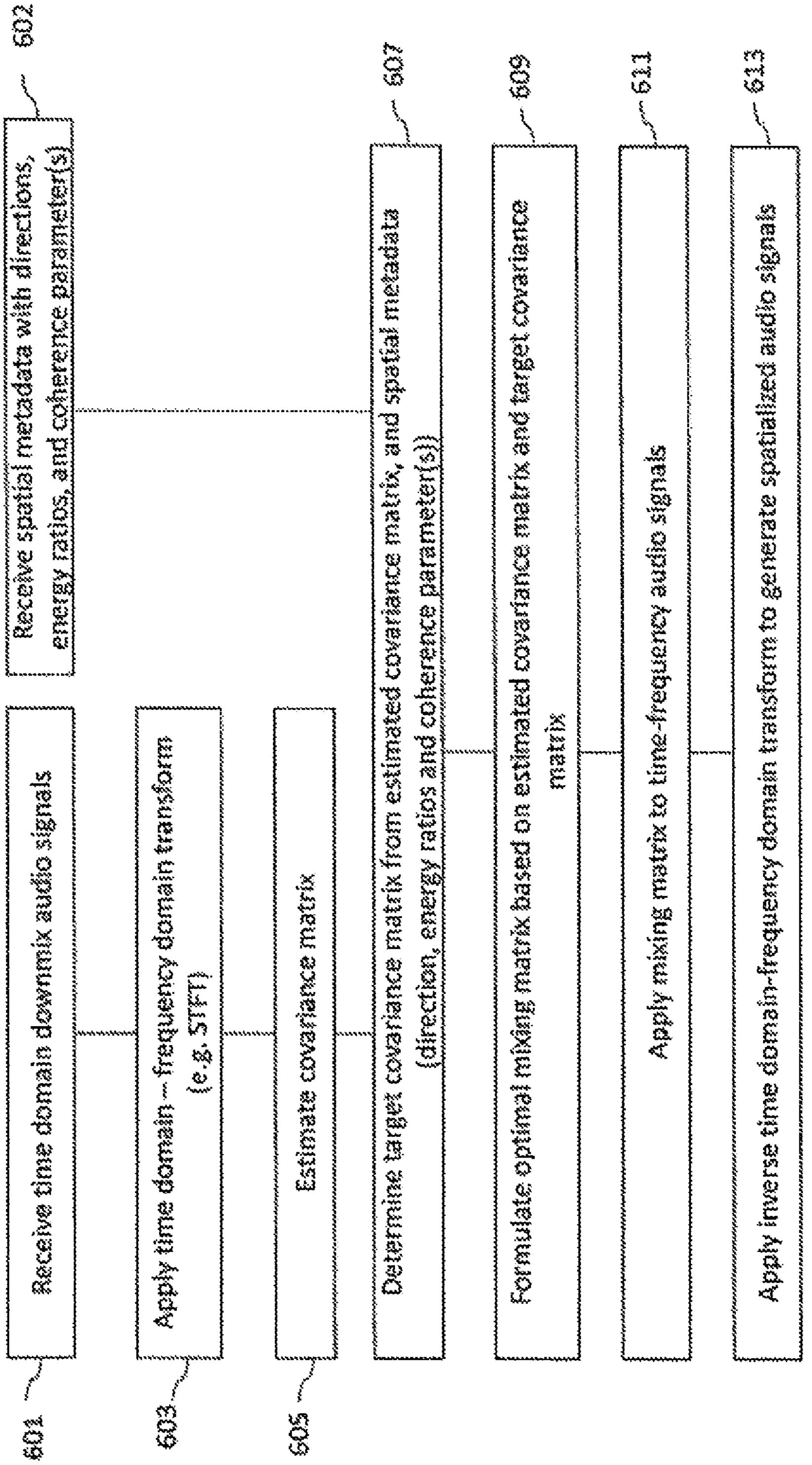
FIG. 7*a* shows a flow diagram of an example operation of the synthesis processor as shown in FIG. 3 according to some embodiments.

With respect to FIG. 7*a* an overview of the synthesis operations are shown.

The method thus may receive the time domain downmix signals as shown in FIG. 7*a* by step 601.

These downmix signals may then be time to frequency domain transformed as shown in FIG. 7*a* by step 603.

The covariance matrix may then be estimated from the input (downmix) signals as shown in FIG. 7*a* by step 605.

Furthermore the spatial metadata with directions, energy ratios and coherence parameters may be received as shown in FIG. 7*a* by step 602.

The target covariance matrix may be determined from the estimated covariance matrix, directions, energy ratios and coherence parameter(s) as shown in FIG. 7*a* by step 607.

The optimal mixing matrix may then be determined based on estimated covariance matrix and target covariance matrix as shown in FIG. 7*a* by step 609.

The mixing matrix may then be applied to the time-frequency downmix signals as shown in FIG. 7*a* by step 611.

The result of the application of the mixing matrix to the time-frequency downmix signals may then be inverse time to frequency domain transformed to generate the spatialized audio signals as shown in FIG. 7*a* by step 613.

Figure 7B:
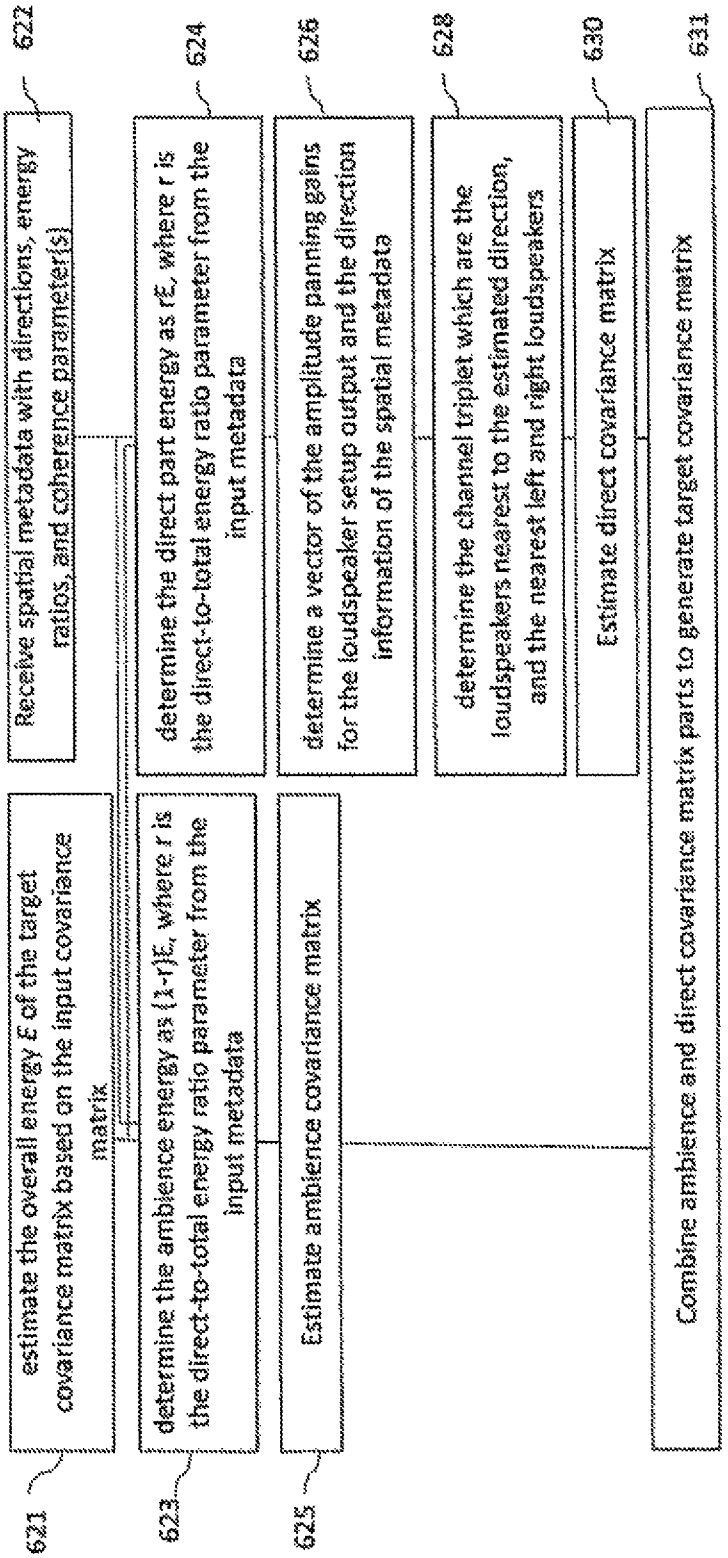
FIG. 7*b* shows a flow diagram of an example operation of a generation of a target covariance matrix according to some embodiments.

With respect to FIG. 7*b* an example method for generating the target covariance matrix according to some embodiments is shown.

First is to estimate the overall energy E of the target covariance matrix based on the input covariance matrix as shown in FIG. 7*b* by step 621.

Then the method may comprise determining the ambience energy as (1−r)E, where r is the direct-to-total energy ratio parameter from the input metadata as shown in FIG. 7*b* by step 623.

Furthermore the method may comprise estimating the ambience covariance matrix as shown in FIG. 7*b* by step 625.

Also the method may comprise determining the direct part energy as rE, where r is the direct-to-total energy ratio parameter from the input metadata as shown in FIG. 7*b* by step 624.

The method may then comprise determining a vector of the amplitude panning gains for the loudspeaker setup and the direction information of the spatial metadata as shown in FIG. 7*b* by step 626.

Following this the method may comprise determining the channel triplet which are the loudspeakers nearest to the estimated direction, and the nearest left and right loudspeakers as shown in FIG. 7*b* by step 628.

Then the method may comprise estimating the direct covariance matrix as shown in FIG. 7*b* by step 630.

Finally the method may comprise combining the ambience and direct covariance matrix parts to generate target covariance matrix as shown in FIG. 7*b* by step 631.

The above formulation discusses the construction of the target covariance matrix. The method in US20140233762A1 and the related journal publication has also further details, most relevantly, the determination and usage of a prototype matrix. The prototype matrix determines a "reference signal" for the rendering with respect to which the least-squares optimized mixing solution is formulated. In case a stereo downmix is provided as the audio signal in the codec, a prototype matrix for loudspeaker rendering can be such that determines that the signals for the left-hand side loudspeakers are optimized with respect to the provided left channel of the stereo track, and similarly for the right hand side (centre channel could be optimized with respect to the sum of the left and right audio channels). For binaural output, the prototype matrix could be such that determines that the reference signal for the left ear output signal is the left stereo channel, and similarly for the right ear. The determination of a prototype matrix is straightforward for an engineer skilled in the field having studied the prior literature. With respect to the prior literature, the novel aspect in the present formulation at the synthesis stage is the construction of the target covariance matrix utilizing also the spatial coherence metadata.

Although not repeated throughout the document, it is to be understood that spatial audio processing, both typically and in this context, takes place in frequency bands. Those bands could be for example, the frequency bins of the time-frequency transform, or frequency bands combining several bins. The combination could be such that approximates properties of human hearing, such as the Bark frequency resolution. in other words, in some cases, we could measure and process the audio in time-frequency areas combining several of the frequency bins b and/or time indices n. For simplicity, these aspects were not expressed by all of the equations above. In case many time-frequency samples are combined, typically one set of parameters such as one direction is estimated for that time-frequency area, and all time-frequency samples within that area are synthesized according to that set of parameters, such as that one direction parameter.

The usage of a frequency resolution for parameter analysis that is different than the frequency resolution of the applied filter-bank is a typical approach in the spatial audio processing systems.

The proposed method can thus detect or identify where the following common multi-channel mixing techniques have been applied to loudspeaker signals:

1) The sound is reproduced coherently using two loudspeakers for creating an "airy" perception (e.g., use front left and right instead of centre).
2) The sound is reproduced coherently using three (or more) loudspeakers for creating a "close" perception (e.g., use front left, right and centre instead of only centre)
3) The sound is reproduced coherently from all (or nearly all) loudspeakers for creating an "inside-the-head" or "above" perception This detection or identification information may in some embodiments be passed from the encoder to the decoder by using a number of (time-frequency domain) parameters. Two of these are the spread coherence and surrounding coherence parameters. In addition, the energy ratio parameter may be modified to improve audio quality having determined such situations as described above.

In the synthesis stage, the state-of-the-art methods (which do not use the proposed novel parameters) have the following issues with these situations, respectively:

1) Sound is reproduced largely as ambient: Dry sound in the centre loudspeaker, and decorrelated sound in all loudspeakers. This results in an ambient-like perception, whereas the perception was "airy" with the original signals.
2) Sound is reproduced partially as ambient: Dry sound in the centre loudspeaker, and decorrelated sound in all loudspeakers. The sound source is perceived to be far away, whereas it was close with original signals.
3) The sound is reproduced as ambient: almost all sound is reproduced as decorrelated from all loudspeakers. The spatial perception is almost the opposite to that of the original signals.

However in the synthesis stages which implement the embodiments described herein, the synthesis can reproduce these cases without issues (using the proposed novel parameters), respectively:

1) The sound is reproduced coherently using two loudspeakers as in the original signals.
2) The sound is reproduced coherently using three loudspeakers as in the original signals.
3) The sound is reproduced coherently using all loudspeakers as in the original signals.

Figure 8:
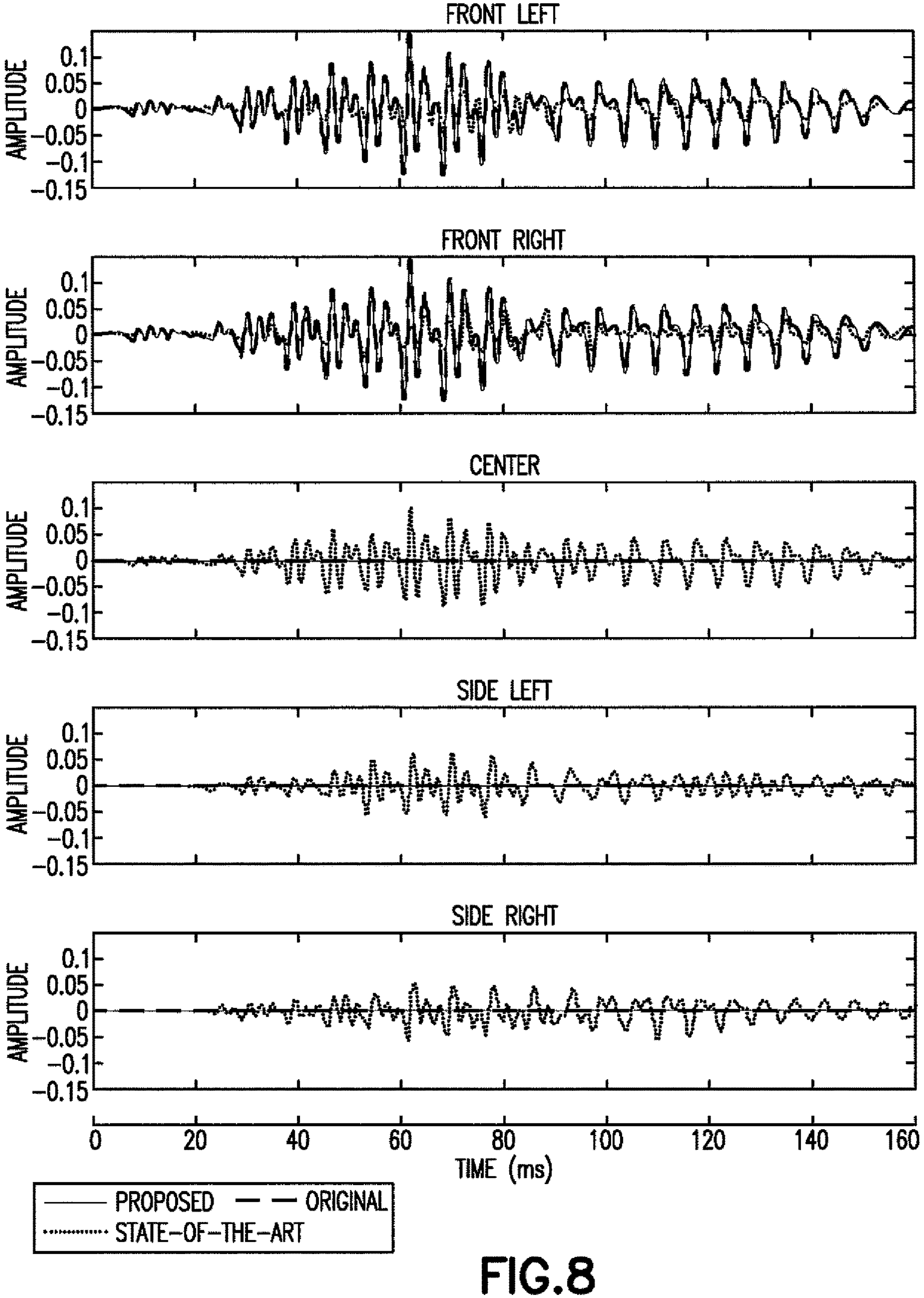
FIGS. 8 to 10 show example graphs of audio signal processing according to known processing techniques and some embodiments.
Figure 9:
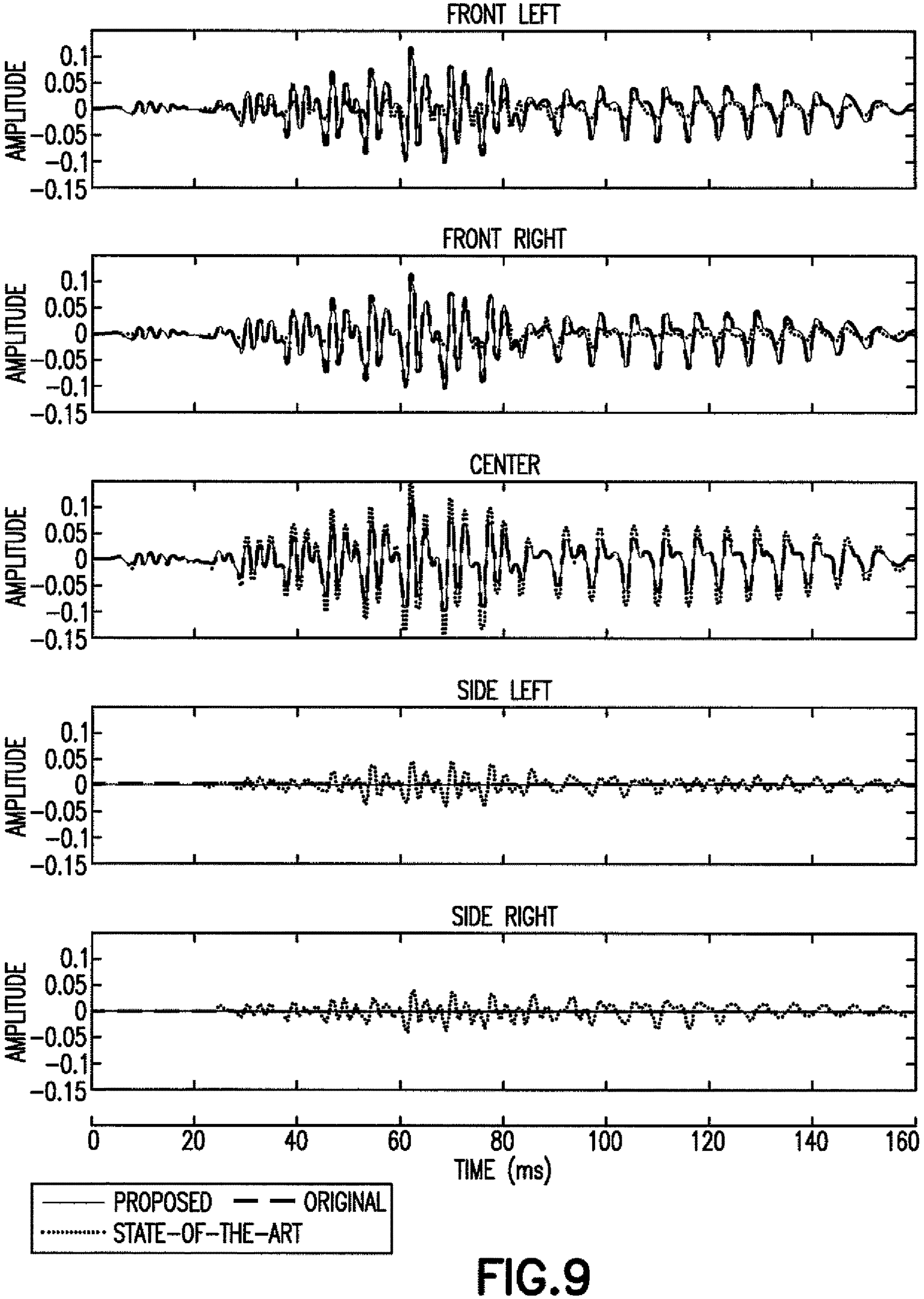
Figure 10:
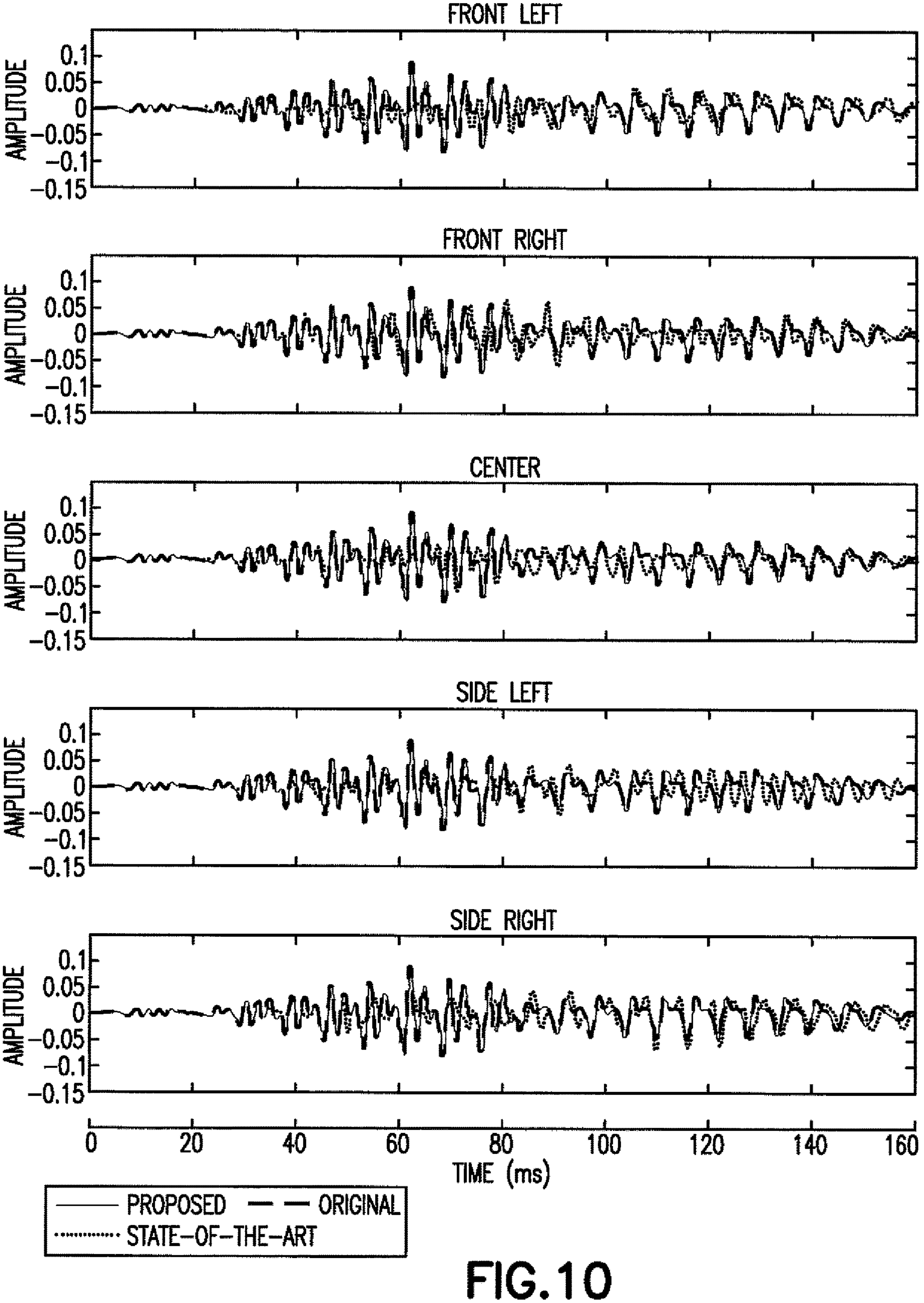

With respect to FIGS. 8 to 10 waveforms are shown of processing example 5.1 audio files with the state-of-the-art and the proposed methods. FIGS. 8 to 10 correspond to the aforementioned situations 1, 2, and 3, respectively. From these Figures it can be clearly seen that the state-of-the-art method modifies the waveforms, and leaks energy to wrong channels, whereas the output of the proposed method follows the original signals accurately.

Figure 11:
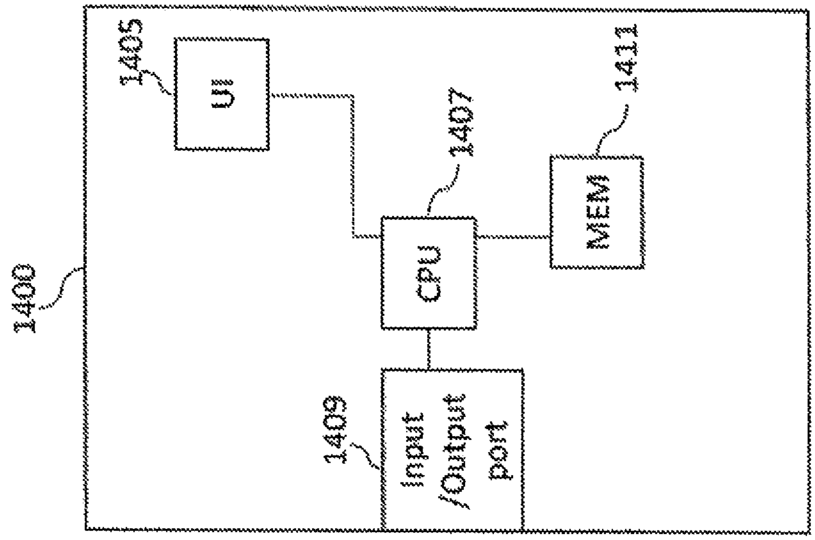
FIG. 11 shows schematically an example device suitable for implementing the apparatus shown in FIGS. 2 and 3.

With respect to FIG. 11 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the loudspeaker signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed by the at least one processor, cause the apparatus at least to:

determine at least one spatial audio parameter for providing spatial audio reproduction;

determine at least one transport signal;

determine at least one coherence parameter for at least two frequency bands, wherein a sound scene is configured to be reproduced based, at least partially, on the at least one transport signal, the at least one spatial audio parameter, and the at least one coherence parameter; and provide the at least one transport signal, the at least one spatial audio parameter, and the at least one coherence parameter for encoding.

2. The apparatus of claim 1, wherein at least one of:

the at least one spatial audio parameter, the at least one transport signal, or the at least one coherence parameter is determined based, at least partially, on one or more microphone signals.

3. The apparatus of claim 1, wherein the sound scene is configured to be reproduced with one or more output channel signals, wherein the at least one coherence parameter is configured to control coherence between the one or more output channel signals.

4. The apparatus of claim 1, wherein the at least one coherence parameter is configured to control a perception of coherence in the sound scene.

5. The apparatus of claim 1, wherein the at least one spatial audio parameter comprises at least one of:

at least one direction parameter, or at least one energy ratio parameter.

6. The apparatus of claim 1, wherein determining the at least one transport signal comprises the at least one memory stores instructions that, when executed by the at least one processor, cause the apparatus to:

determine the at least one transport signal based, at least partially, on two or more playback audio signals configured to reproduce the sound scene, wherein a fewer number of channels are associated with the at least one transport signal than with the two or more playback audio signals.

7. A method comprising:

determining at least one spatial audio parameter for providing spatial audio reproduction;

determining at least one transport signal;

determining at least one coherence parameter for at least two frequency bands, wherein a sound scene is configured to be reproduced based, at least partially, on the at least one transport signal, the at least one spatial audio parameter, and the at least one coherence parameter; and providing the at least one transport signal, the at least one spatial audio parameter, and the at least one coherence parameter for encoding.

8. The method of claim 7, wherein the sound scene is configured to be reproduced with one or more output channel signals, wherein the at least one coherence parameter is configured to control coherence between the one or more output channel signals.

9. An apparatus comprising:

at least one processor; and at least one memory storing instructions that, when executed by the at least one processor, cause the apparatus at least to:

receive at least one transport signal;

receive at least one coherence parameter for at least two frequency bands;

receive at least one spatial audio parameter for providing spatial audio reproduction; and reproduce a sound scene based, at least partially, on the at least one transport signal, the at least one spatial audio parameter, and the at least one coherence parameter.

10. The apparatus of claim 9, wherein reproducing the sound scene comprises the at least one memory stores instructions that, when executed by the at least one processor, cause the apparatus to:

generate one or more output channel signals, wherein the at least one coherence parameter is configured to control coherence between the one or more output channel signals.

11. The apparatus of claim 9, wherein the at least one coherence parameter is configured to control a perception of coherence in the sound scene.

12. The apparatus of claim 9, wherein the at least one spatial audio parameter comprises at least one of:

at least one direction parameter, or at least one energy ratio parameter.

13. The apparatus of claim 12, wherein the at least one memory stores instructions that, when executed by the at least one processor, cause the apparatus to:

determine at least one ambient audio signal based, at least partially, on the at least one transport signal and the at least one energy ratio parameter; and determine at least one direct audio signal based, at least partially, on the at least one transport signal and the at least one energy ratio parameter.

14. The apparatus of claim 13, wherein the at least one coherence parameter is configured to control whether the at least one direct audio signal is configured to be perceived as a direct point source or as a coherent sound.

15. The apparatus of claim 13, wherein the at least one coherence parameter is configured to control whether the at least one ambient audio signal is configured to be perceived as coherent or non-coherent.

16. The apparatus of claim 9, wherein the at least one spatial audio parameter comprises at least one direction parameter and at least one energy ratio, wherein reproducing the sound scene comprises the at least one memory stores instructions that, when executed by the at least one processor, cause the apparatus to:

determine a target covariance matrix based, at least partially, on the at least one spatial audio parameter, the at least one coherence parameter, and an estimated covariance matrix, wherein the estimated covariance matrix is based, at least partially, on the at least one transport signal;

generate a mixing matrix based, at least partially, on the target covariance matrix and the estimated covariance matrix; and apply the mixing matrix to the at least one transport signal to generate at least two output spatial audio signals for reproducing the sound scene.

17. The apparatus of claim 16, wherein determining the target covariance matrix comprises the at least one memory stores instructions that, when executed by the at least one processor, cause the apparatus to:

determine a total energy parameter based, at least partially, on the estimated covariance matrix;

determine a direct energy and an ambience energy based, at least partially, on the total energy parameter and the at least one energy ratio;

estimate an ambience covariance matrix based, at least partially, on the determined ambience energy and one of the at least one coherence parameter;

estimate at least one of:

a vector of amplitude panning gains, an Ambisonic panning vector, or at least one head related transfer function, based, at least partially, on at least one of an output channel configuration or the at least one direction parameter;

estimate a direct covariance matrix based, at least partially, on:

the vector of amplitude panning gains, the Ambisonic panning vector, or the at least one head related transfer function;

the determined direct energy; and a further one of the at least one coherence parameter; and generate the target covariance matrix via combining the ambience covariance matrix and the direct covariance matrix.

18. The apparatus of claim 9, wherein the at least one transport signal is based on two or more playback audio signals configured to reproduce the sound scene, wherein a fewer number of channels are associated with the at least one transport signal than with the two or more playback audio signals.

19. A method comprising:

receiving at least one transport signal;

receiving at least one coherence parameter for at least two frequency bands;

receiving at least one spatial audio parameter for providing spatial audio reproduction; and reproducing a sound scene based, at least partially, on the at least one transport signal, the at least one spatial audio parameter, and the at least one coherence parameter.

20. The method of claim 19, further comprising:

generating one or more output channel signals, wherein the at least one coherence parameter is configured to control coherence between the one or more output channel signals.

* * * * *